US 7,035,290 B1

(12) United States Patent  (10) Patent No.: US 7,035,290 B1
Lyle  (45) Date of Patent: Apr. 25, 2006

(54) METHOD AND SYSTEM FOR TEMPORARY INTERRUPTION OF VIDEO DATA TRANSMISSION

(75) Inventor: James D. Lyle, Santa Clara, CA (US)

(73) Assignee: Silicon Image, Inc., Sunnyvale, CA (US)

(*) Notice: Subject to any disclaimer, the term of this patent is extended or adjusted under 35 U.S.C. 154(b) by 918 days.

(21) Appl. No.: 10/085,177

(22) Filed: Feb. 27, 2002

(51) Int. Cl.
*H04J 3/16* (2006.01)
(52) U.S. Cl. ....................... 370/498; 370/465
(58) Field of Classification Search ................ 370/498, 370/384, 465, 466, 350, 503; 375/354, 359, 375/243
See application file for complete search history.

(56) References Cited

U.S. PATENT DOCUMENTS 5,845,201 A * 12/1998 Funke et al. ................ 455/403

OTHER PUBLICATIONS

*High-Bandwidth Digital Content Protection System*, Revision 1.0, by Intel Corporation, Feb. 17, 2000, pp. 1-60.
*High-Bandwith Digital Content Protection Ssytem Revision 1.0 Erratum*, by Intel Corporation, Mar. 19, 2001, pp. 1-9.
*Upstream Link for High-bandwidth Digital Content Protection*, Revision 1.00, by Intel Corporation, Jan. 26, 2001, pp. 1-38.
National Institute of Standards and Technology, Draft FIPS for the AES, 48 pages, downloaded from the Internet (from http://csrc.nist.gov/encryption/aes) on Sep. 18, 2001.

* cited by examiner

*Primary Examiner*—Dang Ton
(74) *Attorney, Agent, or Firm*—Girard & Equitz LLP

(57) ABSTRACT

A communication system including a transmitter, a receiver, and a serial link, that is capable of transmitting packets of data (e.g., frames of video data) over the link. The transmitter and receiver are operable in any selected one of a transmission mode (in which the data are transmitted over the link from the transmitter to the receiver) and a mute mode in which transmission of data over the link has been interrupted. Typically in the transmission mode, encrypted video data are transmitted and decrypted by the receiver. Other aspects of the invention are transmitters and receivers for use in, and methods implemented by, any embodiment of such system. Typically, each transition between transmission mode and mute mode operation requires that the device undergoing the transition (whether a transmitter or receiver) receives a warning that the transition is to occur. In response to such warning, a transmitter in the transmission mode waits for the next packet boundary, or more generally the Nth packet boundary after the warning, before entering the mute mode. If the transmitter encrypts video during the transmission mode, the cipher engine is allowed to finish its work on the current frame (and any other frame to be encrypted before entry into the mute mode) but is not allowed to send any signal that affects any frame occurring after entry into the mute mode. When the transmitter and receiver include cipher engines, each cipher engine including a state machine, operation of the state machines should freeze during the mute mode, and the cipher engines' outputs should be driven to black or another predetermined state or otherwise hidden or suppressed.

41 Claims, 6 Drawing Sheets

| INPUT | B0 | B1 | B2 | B3 | B4 | B5 | B6 | B7 | K0 | K1 | K2 | K3 | K4 | K5 | K6 | K7 |
|---|---|---|---|---|---|---|---|---|---|---|---|---|---|---|---|---|
| ORIGIN | Bz | Bz | Bz | Bz | Bz | Bz | Bz | By | Kz | Kz | Kz | Kz | Kz | Kz | Kz | Ky |
| OUTPUT BIT | | | | | | | | | | | | | | | | |
| 0  | 17 | 26 | 22 | 27 | 21 | 18 |  2 |  5 |  3 |  6 |  0 |  9 |  4 | 22 |  5 | 10 |
| 1  |  5 | 20 | 15 | 24 |  2 | 25 |  0 | 16 | 20 | 18 |  7 | 23 | 15 |  5 |  3 | 25 |
| 2  | 22 |  5 | 14 | 16 | 25 | 17 | 20 | 11 |  7 | 19 |  2 | 10 | 22 |  4 | 13 | 21 |
| 3  | 19 |  3 | 15 | 11 | 21 | 16 | 27 |  1 |  6 | 14 |  9 |  8 | 17 | 18 | 12 | 24 |
| 4  | 19 |  6 | 17 | 18 | 22 |  7 |  9 | 12 | 25 |  6 |  5 |  2 | 10 | 15 | 21 |  8 |
| 5  |  3 |  7 |  4 |  8 | 16 |  6 |  5 | 17 | 27 | 14 |  2 |  4 | 24 | 19 |  1 | 12 |
| 6  |  8 | 21 | 27 |  2 | 11 | 24 | 12 |  3 | 17 | 26 |  4 | 16 | 27 |  7 | 22 | 11 |
| 7  |  9 |  5 |  7 |  4 |  8 | 13 |  3 | 15 |  9 | 10 | 19 | 11 |  7 |  6 |  8 | 23 |
| 8  | 26 | 13 | 23 | 10 | 11 |  7 | 15 | 19 | 13 | 12 | 18 | 24 | 15 | 23 |  7 | 16 |
| 9  |  1 |  0 | 19 | 11 | 13 | 16 | 24 | 18 |  0 |  5 | 20 | 25 |  1 | 24 |  9 | 27 |
| 10 | 26 | 13 |  9 | 14 | 10 |  4 |  1 |  2 | 14 | 23 | 27 | 25 | 17 | 19 |  1 | 22 |
| 11 | 21 | 15 |  5 |  3 | 13 | 25 | 16 | 27 |  6 | 21 | 17 | 15 | 26 | 11 | 16 |  7 |
| 12 | 20 |  7 | 18 | 12 | 17 |  1 | 16 |  0 | 11 | 22 | 20 |  0 | 26 | 23 | 17 |  2 |
| 13 | 14 | 23 |  1 | 12 | 24 |  6 | 18 |  9 |  8 |  4 |  3 | 14 | 20 | 26 | 23 | 15 |
| 14 | 19 |  6 | 21 | 25 | 23 |  1 | 10 |  8 | 19 |  0 | 18 |  2 | 13 |  8 | 24 | 14 |
| 15 |  3 |  0 | 27 | 23 | 19 |  8 |  4 |  7 | 16 | 21 | 24 | 25 | 12 | 27 | 15 | 18 |
| 16 |  6 |  5 | 14 | 22 | 24 | 18 |  2 | 21 |  3 |  5 |  8 | 25 |  7 | 27 |  2 | 26 |
| 17 |  3 |  4 |  2 |  6 | 22 | 14 | 12 | 26 | 11 | 14 | 23 | 17 | 22 | 13 | 19 |  4 |
| 18 | 25 | 21 | 19 |  9 | 10 | 15 | 13 | 22 |  1 | 16 | 14 | 11 | 12 |  6 | 10 | 19 |
| 19 | 23 | 11 | 10 | 20 |  1 | 12 | 14 |  4 | 21 |  1 | 10 | 20 | 18 | 26 |  9 | 13 |
| 20 | 11 | 26 | 20 | 17 |  8 | 23 |  0 | 24 | 20 | 21 |  9 | 25 | 12 |  3 | 15 |  0 |
| 21 |  9 | 17 | 26 |  4 | 27 |  0 | 15 |  6 | 18 | 12 | 21 | 27 |  1 | 16 | 24 | 20 |
| 22 | 22 | 12 |  2 | 10 |  7 | 20 | 25 | 13 | 13 |  0 |  3 | 16 | 22 | 11 | 26 |  9 |
| 23 | 27 | 24 | 26 |  8 |  0 |  9 | 18 | 23 |  2 |  0 | 13 |  5 |  4 |  8 | 10 |  3 |

FIG. 5
(PRIOR ART)

METHOD AND SYSTEM FOR TEMPORARY INTERRUPTION OF VIDEO DATA TRANSMISSION

TECHNICAL FIELD OF THE INVENTION

The invention pertains to methods and systems for transmission of video data (or other data) over a TMDS link or other serial link. More specifically, the invention pertains to methods and systems capable of temporarily interrupting the transmission of encrypted or nonencrypted video data (or other data) over a serial link.

BACKGROUND OF THE INVENTION

There are various, well-known serial links for transmitting video data and other data. One conventional serial link is known as a transition minimized differential signaling interface ("TMDS" link). This link is used primarily for high-speed transmission of video data from a set-top box to a television, and also for high-speed transmission of video data from a host processor (e.g., a personal computer) to a monitor. Among the characteristics of a TMDS link are the following:

1. video data are encoded and then transmitted as encoded words (each 8-bit word of digital video data is converted to an encoded 10-bit word before transmission);
   a. the encoding determines a set of "in-band" words and a set of "out-of-band" words (the encoder can generate only "in-band" words in response to video data, although it can generate "out-of-band" words in response to control or sync signals. Each in-band word is an encoded word resulting from encoding of one input video data word. All words transmitted over the link that are not in-band words are "out-of-band" words);
   b. the encoding of video data is performed such that the in-band words are transition minimized (a sequence of in-band words has a reduced or minimized number of transitions);
   c. the encoding of video data is performed such that the in-band words are DC balanced (the encoding prevents each transmitted voltage waveform that is employed to transmit a sequence of in-band words from deviating by more than a predetermined threshold value from a reference potential. Specifically, the tenth bit of each "in-band" word indicates whether eight of the other nine bits thereof have been inverted during the encoding process to correct for an imbalance between running counts of ones and zeroes in the stream of previously encoded data bits);
2. the encoded video data and a video clock signal are transmitted as differential signals (the video clock and encoded video data are transmitted as differential signals over conductor pairs);
3. three conductor pairs are employed to transmit the encoded video, and a fourth conductor pair is employed to transmit the video clock signal; and
4. signal transmission occurs in one direction, from a transmitter (typically associated with a desktop or portable computer, or other host) to a receiver (typically an element of a monitor or other display device).

It has been proposed to encrypt video data for transmission over a TMDS serial link (e.g., from a set-top box to a television). For example, it has been proposed to use the cryptographic protocol known as the "High-bandwidth Digital Content Protection" ("HDCP") protocol to encrypt digital video data to be transmitted over a TMDS link of the "Digital Video Interface" ("DVI" link) adopted by the Digital Display Working Group, and to decrypt the encrypted video data at the DVI receiver.

A DVI link can be implemented to include two TMDS links (which share a common conductor pair for transmitting a video clock signal) or one TMDS link, as well as additional control lines between the transmitter and receiver. We shall describe a DVI link (that includes one TMDS link) with reference to FIG. 1. The DVI link of FIG. 1 includes transmitter 1, receiver 3, and the following conductors between the transmitter and receiver: four conductor pairs (Channel 0, Channel 1, and Channel 2 for video data, and Channel C for a video clock signal), Display Data Channel ("DDC") lines for bidirectional communication between the transmitter and a monitor associated with the receiver in accordance with the conventional Display Data Channel standard (the Video Electronics Standard Association's "Display Data Channel Standard," Version 2, Rev. 0, dated Apr. 9, 1996), a Hot Plug Detect (HPD) line (on which the monitor transmits a signal that enables a processor associated with the transmitter to identify the monitor's presence), Analog lines (for transmitting analog video to the receiver), and Power lines (for providing DC power to the receiver and a monitor associated with the receiver). The Display Data Channel standard specifies a protocol for bidirectional communication between a transmitter and a monitor associated with a receiver, including transmission by the monitor of an Extended Display Identification ("EDID") message that specifies various characteristics of the monitor, and transmission by the transmitter of control signals for the monitor. Transmitter 1 includes three identical encoder/serializer units (units 2, 4, and 5) and additional circuitry (not shown). Receiver 3 includes three identical recovery/decoder units (units 8, 10, and 12) and inter-channel alignment circuitry 14 connected as shown, and additional circuitry (not shown).

As shown in FIG. 1, circuit 2 encodes the data to be transmitted over Channel 0, and serializes the encoded bits. Similarly, circuit 4 encodes the data to be transmitted over Channel 1 (and serializes the encoded bits), and circuit 6 encodes the data to be transmitted over Channel 2 (and serializes the encoded bits). Each of circuits 2, 4, and 6 responds to a control signal (an active high binary control signal referred to as a "data enable" or "DE" signal) by selectively encoding either digital video words (in response to DE having a high value) or a control or synchronization signal pair (in response to DE having a low value). Each of encoders 2, 4, and 6 receives a different pair of control or synchronization signals: encoder 2 receives horizontal and vertical synchronization signals (HSYNC and VSYNC); encoder 4 receives control bits CTL0 and CTL1; and encoder 6 receives control bits CTL2 and CTL3. Thus, each of encoders 2, 4, and 6 generates in-band words indicative of video data (in response to DE having a high value), encoder 2 generates out-of-band words indicative of the values of HSYNC and VSYNC (in response to DE having a low value), encoder 4 generates out-of-band words indicative of the values of CTL0 and CTL1 (in response to DE having a low value), and encoder 6 generates out-of-band words indicative of the values of CTL2 and CTL3 (in response to DE having a low value). In response to DE having a low value, each of encoders 4 and 6 generates one of four specific out-of-band words indicative of the values 00, 01, 10, or 11, respectively, of control bits CTL0 and CTL1 (or CTL2 and CTL3).

As noted above, it has been proposed to use the cryptographic protocol known as the "High-bandwidth Digital Content Protection" ("HDCP") protocol to encrypt digital video to be transmitted over a DVI link and to decrypt the data at the DVI receiver. The HDCP protocol is described in the document "High-bandwidth Digital Content Protection System," Revision 1.0, dated Feb. 17, 2000, by Intel Corporation, and the document "High-bandwidth Digital Content Protection System Revision 1.0 Erratum," dated Mar. 19, 2001, by Intel Corporation. The full text of both of these documents is incorporated herein by reference.

A DVI transmitter implementing the HDCP protocol asserts a stream of pseudo-randomly generated 24-bit words, known as cout[23:0], during the video active period (i.e. when DE is high). Each 24-bit word of the cout data is "Exclusive Ored" (in logic circuitry in the transmitter) with a 24-bit word of RGB video data input to the transmitter, in order to encrypt the video data. The encrypted data are then encoded (according to the TMDS standard) for transmission. The same sequence of cout words is also generated in the receiver. After the encoded and encrypted data received at the receiver undergo TMDS decoding, the cout data are processed together with the decoded video in logic circuitry in order to decrypt the decoded data and recover the original input video data.

Before the transmitter begins to transmit HDCP encrypted, encoded video data, the transmitter and receiver communicate bidirectionally with each other to execute an authentication protocol (to verify that the receiver is authorized to receive protected content, and to establish shared secret values for use in encryption of input data and decryption of transmitted encrypted data). More specifically, each of the transmitter and the receiver is preprogrammed (e.g., at the factory) with a 40-bit word known as a key selection vector, and an array of forty 56-bit private keys. To initiate the first part of an authentication exchange between the transmitter and receiver, the transmitter asserts its key selection vector (known as "AKSV"), and a pseudo-randomly generated session value ("An") to the receiver. In response, the receiver sends its key selection vector (known as "BKSV") and a repeater bit (indicating whether the receiver is a repeater) to the transmitter, and the receiver also implements a predetermined algorithm using "AKSV" and the receiver's array of forty private keys to calculate a secret value ("Km"). In response to the value "BKSV" from the receiver, the transmitter implements the same algorithm using the value "BKSV" and the transmitter's array of forty private keys to calculate the same secret value ("Km") as does the receiver.

Each of the transmitter and the receiver then uses the shared secret value "Km," the session value "An," and the repeater bit to calculate a session key ("Ks") and two values ("M0" and "R0") for use during a second part of the authentication exchange. The second part of the authentication exchange is performed only if the repeater bit indicates that the receiver is a repeater, to determine whether the status of one or more downstream devices coupled to the repeater requires revocation of the receiver's authentication.

After the first part of the authentication exchange, and (if the second part of the authentication exchange is performed) if the receiver's authentication is not revoked as a result of the second part of the authentication exchange, each of the transmitter and the receiver generates a 56-bit frame key Ki (for initiating the encryption or decrypting a frame of video data), an initialization value Mi, and a value Ri used for link integrity verification. The Ki, Mi, and Ri values are generated in response to a control signal (identified as "ctl3" in FIG. 2), which is received at the appropriate circuitry in the transmitter, and is also sent by the transmitter to the receiver, during each vertical blanking period, when DE is low. As shown in the timing diagram of FIG. 2, the control signal "ctl3" is a single high-going pulse. In response to the Ki, Mi, and Ri values, each of the transmitter and receiver generates a sequence of pseudo-randomly generated 24-bit words cout[23:0]. Each 24-bit word of the cout data generated by the transmitter is "Exclusive Ored" (in logic circuitry in the transmitter) with a 24-bit word of a frame of video data (to encrypt the video data). Each 24-bit word of the cout data generated by the receiver is "Exclusive Ored" (in logic circuitry in the receiver) with a 24-bit word of the first received frame of encrypted video data (to decrypt this encrypted video data). The 24-bit words cout[23:0] generated by the transmitter are encryption keys (for encrypting a line of input video data), and the 24-bit words cout[23:0] generated by the receiver are decryption keys (for decrypting a received and decoded line of encrypted video data).

During each horizontal blanking interval (in response to each falling edge of the data enable signal DE) following assertion of the control signal ctl3, the transmitter performs a rekeying operation and the receiver performs the same rekeying operation to change (in a predetermined manner) the cout data words to be asserted during the next active video period. This continues until the next vertical blanking period, when the control signal ctl3 is again asserted to cause each of the transmitter and the receiver to calculate a new set of Ki and Mi values (with the index "i" being incremented in response to each assertion of the control signal ctl3). The Ri value is updated once every 128 frames. Actual encryption of input video data (or decryption of received, decoded video data) is performed, using the cout data words generated in response to the latest set of Ks, Ki and Mi values, only when DE is high (not during vertical or horizontal blanking intervals).

Each of the transmitter and receiver includes an HDCP cipher circuit (sometimes referred to herein as an "HDCP cipher") of the type shown in FIG. 3. The HDCP cipher includes linear feedback shift register (LFSR) module 80, block module 81 coupled to the output of LFSR module 80, and output module 82 coupled to an output of block module 81. LFSR module 80 is employed to re-key block module 81 in response to each assertion of an enable signal (the signal "ReKey" shown in FIG. 3), using the session key (Ks) and the current frame key (Ki). Block module 81 generates (and provides to module 80) the key Ks at the start of a session and generates (and applies to module 80) a new value of key Ki at the start of each frame of video data (in response to a rising edge of the control signal "ctl3," which occurs in the first vertical blanking interval of a frame). The signal "ReKey" is asserted to the FIG. 3 circuit at each falling edge of the DE signal (i.e., at the start of each vertical and each horizontal blanking interval), and at the end of a brief initialization period (during which module 81 generates an updated value of the frame key Ki) after each rising edge of signal "ctl3."

Module 80 consists of four linear feedback shift registers (having different lengths) and combining circuitry coupled to the shift registers and configured to assert a single output bit per clock interval to block module 81 during each of a fixed number of clock cycles (e.g., 56 cycles) commencing on each assertion of the signal "ReKey" when DE is low (i.e., in the horizontal blanking interval of each line of video data). This output bit stream is employed by block module 81 to re-key itself just prior to the start of transmission or reception of each line of video data.

Block module 81 comprises two halves, "Round Function K" and "Round Function B," as shown in FIG. 4. Round Function K includes 28-bit registers Kx, Ky, and Kz, seven S-Boxes (each a 4 input bit by 4 output bit S-Box including a look-up table) collectively labeled "S-Box K" in FIG. 4, and linear transformation unit K, connected as shown. Round Function B includes 28-bit registers Bx, By, and Bz, seven S-Boxes (each a 4 input bit by 4 output bit S-Box including a look-up table) collectively labeled "S-Box B" in FIG. 4, and linear transformation unit B, connected as shown. Round Function K and Round Function B are similar in design, but Round Function K performs one round of a block cipher per clock cycle to assert a different pair of 28-bit round keys (Ky and Kz) each clock cycle in response to the output of LFSR module 80, and Round Function B performs one round of a block cipher per clock cycle, in response to each 28-bit round key Ky from Round Function K and the output of LFSR module 80, to assert a different pair of 28-bit round keys (By and Bz) each clock cycle. The transmitter generates value An at the start of the authentication protocol and the receiver responds to it during the authentication procedure. The value An is used to randomize the session key. Block module 81 operates in response to the authentication value (An), and the initialization value (Mi) which is updated by output module 82 at the start of each frame (at each rising edge of the control signal "ctl3").

Each of linear transformation units K and B outputs 56 bits per clock cycle. These output bits are the combined outputs of eight diffusion networks in each transformation unit. Each diffusion network of linear transformation unit K produces seven output bits in response to seven of the current output bits of registers Ky and Kz. Each of four of the diffusion networks of linear transformation unit B produces seven output bits in response to seven of the current output bits of registers By, Bz, and Ky, and each of the four other diffusion networks of linear transformation unit B produces seven output bits in response to seven of the current output bits of registers By and Bz.

In Round Function K, one bit of register Ky takes its input from the bit stream asserted by module 80 when the ReKey signal is asserted. In Round Function B, one bit of register By takes its input from the bit stream asserted by module 80 when the ReKey signal is asserted.

Output module 82 performs a compression operation on the 28-bit keys (By, Bz, Ky and Kz) asserted to it (a total of 112 bits) by module 81 during each clock cycle, to generate one 24-bit block of pseudo-random bits cout[23:0] per clock cycle. Each of the 24 output bits of module 82 consists of the exclusive OR ("XOR") of nine terms as follows: (B0*K0)+(B1*K1)+(B2*K2)+(B3*K3)+(B4*K4)+(B5*K5)+(B6*K6)+(B7)+(K7), where "*" denotes a logical AND operation and "+" denotes a logical XOR operation. FIG. 5 specifies the input values B0–B7 and K0–K7 in the preceding expression for generating each of the 24 output bits of module 82. For example, FIG. 5 indicates that in order to generate output bit 0 (i.e., cout(0)), B0 is the seventeenth bit of register Bz, K0 is the third bit of register Kz, B1 is the twenty-sixth bit of register Bz, and so on.

In the transmitter, logic circuitry 83 (shown in FIG. 3) receives each 24-bit word of cout data and each input 24-bit RGB video data word, and performs a bitwise XOR operation thereon in order to encrypt the video data, thereby generating a word of the "data_encrypted" data indicated in FIG. 3. Typically, the encrypted data subsequently undergoes TMDS encoding before it is transmitted to a receiver. In the receiver, logic circuitry 83 (shown in FIG. 3) receives each 24-bit block of cout data and each recovered 24-bit RGB video data word (after the recovered data has undergone TMDS decoding), and performs a bitwise XOR operation thereon in order to decrypt the recovered video data.

Throughout the specification and in the claims the expression "TMDS-like link" will be used to denote a serial link, capable of transmitting digital video data (and a clock for the digital video data) from a transmitter to a receiver, and optionally also transmitting one or more additional signals (bidirectionally or unidirectionally) between the transmitter and receiver, that is or includes either a TMDS link or a link having some but not all of the characteristics of a TMDS link.

There are several conventional TMDS-like links. One type of TMDS-like link is the set of serial links known as Low Voltage Differential Signaling ("LVDS") links (e.g., "LDI," the LVDS Display Interface), each of which satisfies the TIA/EIA-644 standard or the IEEE-1596.3 standard. In each system including an LVDS link, the data are sent on a high-speed differential link with a synchronous clock. There is a single clock line with a four to three duty cycle and several different combinations of data lines depending on the data rate and bit depth. An LVDS link is a serial and differential video link, but the video data transmitted over an LVDS link is not encoded.

Other TMDS-like links encode input video and auxiliary data to be transmitted into encoded words, typically comprising more bits than the input data, using a coding algorithm other than the specific algorithm used in a TMDS link. Some such links transmit the encoded video data as in-band characters and the other encoded data as out-of-band characters. The characters can be classified as in-band or out-of-band characters based according to whether they satisfy transition minimization and DC balance criteria, or other classification criteria. An example of an encoding algorithm, other than that used in a TMDS link but which could be used in a TMDS-like link, is IBM 8b10b coding. The classification between in-band and out-of-band characters need not be based on whether the number of transitions of each character exceeds a threshold number. For example, the number of transitions of each in-band and out-of-band character could in some embodiments be in a single range (e.g., a middle range defined by a minimum and a maximum number of transitions).

The data transmitted between the transmitter and receiver of a TMDS-like link can but need not be transmitted differentially (over a pair of conductors). Although the differential nature of TMDS is important in some applications, it is contemplated that some TMDS-like links will transmit data other than differential data. Also, although a TMDS link has four differential pairs (in the single pixel version), three for video data and the other for a video clock, a TMDS-like link could have a different number of conductors or conductor pairs.

Temporarily interrupting the transmission of a video data stream over a serial link to a display disrupts at least the displayed picture. Depending on the timing, though, interruption of video data transmission over a serial link can have a greater or lesser additional effect. It can cause glitches in the processing of sync signals transmitted with the video, or display of partial frames, partial lines, or strange numbers of lines, and so on. Further, if the video data are transmitted in encrypted form (e.g., as HDCP-encrypted video) and the encrypted video data are decrypted prior to display, the interruption can prevent the decrypting cipher engine from having a known state relative to the encrypting cipher engine at the end of the interruption interval. The encrypting and decrypting cipher engines may not be able to resume synchronous operation at the end of an interruption interval unless re-synchronization is performed. In general, the result of interruption of a video data stream over a serial link is difficult to control or predict.

These considerations are important because temporary video transmission interruptions are likely to be common events in operation of a serial link. For example, they can occur if the transmission "channel" changes, or if the screen resolution changes, or if some other parameter changes. In each case, a clean transition is a highly desirable feature. It can take significant time (e.g., several seconds) to re-establish encrypted data transmission over a serial link after such transmission is terminated (typically, such re-establishment requires verification as well as synchronization of cipher engines on both sides of the link). Thus, it is highly desirable that an established content protection session survive a temporary interruption in data transmission over the link. The present invention allows interruption of video transmission over a serial link to be accomplished in a manner avoiding the disadvantages of conventional video transmission interruption.

SUMMARY OF THE INVENTION

In a class of embodiments, the invention is a communication system that includes a transmitter, a receiver, and at least one TMDS-like link (or other serial link), where the transmitter is capable of transmitting packets of data (e.g., frames of video data and optionally also packets of auxiliary data) over the link. The term "packet" is used in a broad sense to denote a frame or other quantity of serially transmitted data having an identifiable beginning and end. The transmitter and receiver are operable in any selected one of a transmission mode (in which data are transmitted over the link from the transmitter to the receiver) and a mute mode (in which transmission of data over the link is interrupted). The data can be or include video data, audio data, and/or other data. In typical implementations of the transmission mode, the video data are transmitted in encrypted form over the link and decrypted by a cipher engine in the receiver. Other aspects of the invention are transmitters and receivers for use in any embodiment of the inventive system, and methods implemented by any embodiment of the inventive system or apparatus.

In accordance with the invention, data (e.g., video data) transmission over a serial link is interrupted in a clean fashion and then resumed in a clean fashion. The transitions between mute modes and transmission modes occur only at packet boundaries, in such a manner that sync and other control signals transmitted with (or as part of) the data do not undergo processing glitches, and do not occur at incorrect times, fail to occur at correct times, or cause unintended operations as a result of the transitions.

In typical embodiments, each transition from transmission mode operation to mute mode operation in accordance with the invention requires that the device undergoing the transition (whether it is a transmitter or receiver) has prior information that the transition will occur. For a transmitter, this can be accomplished by asserting a control signal to a pin of the transmitter or loading one or more control bits to a register or similar element in the transmitter. Such control signal, control bit, or set of control bits will sometimes be referred to herein as a "warning" or "warning signal." In response to a warning, the transmitter waits for the next packet boundary, or more generally for the Nth packet boundary after the warning, before entering the mute mode. Typically, if the transmitter receives the warning at a packet boundary, it waits for the next packet boundary (or the Nth packet boundary after the boundary at which the warning occurs) before entering the mute mode. In embodiments in which the transmitter encrypts video during the transmission mode, the cipher engine is allowed to finish its work on the current frame (and any other frame that is encrypted before entry into the mute mode) including by performing any required re-keying, but is not allowed to send any signal that affects any subsequent frame (i.e., any frame that occurs after entry into the mute mode). During mute mode operation, the transmitter does not transmit any sync signal (e.g., any HSYNC, VSYNC, or DE signal) over the link, and the output of the transmitter does not change in response to any video input asserted to the transmitter.

When a transmitter has received a warning from a host device (e.g., an MPEG decoder or graphics adapter) that is the source (or controls the source) of video or other data to be transmitted, and the transmitter has waited for the appropriate packet boundary and entered the mute mode, the transmitter preferably asserts an acknowledgement to the host device that it has entered the mute mode. Preferably, the host device is implemented so that, after asserting the warning to the transmitter, the host device does not actually interrupt or change the video stream input to the transmitter until receiving the acknowledgement from the transmitter.

Typically, the receiver is also warned of each imminent transition to mute mode operation and the receiver takes appropriate action in response to accomplish the transition. In some embodiments, however, the receiver needs no warning of such a transition. Minimally, in embodiments in which transitions to mute mode operation occur at boundaries between consecutively transmitted frames of video data, if the receiver decrypts encrypted video during the transmission mode, its content protection engine needs to finish work on the current frame (and any other frame that is decrypted before entry into mute mode operation) including by performing any required re-keying. The receiver may also need to save state in some way (e.g., if it has a cipher engine, the cipher engine should freeze at the end of the transmission mode in its final state, so that it can resume operation in this state at the end of the mute mode). The warning to the receiver can be a signal transmitted over the link itself, over the same channel or channels that transmit the video data (e.g., a sequence of the code words that determine a pattern of one, or more then one, of the control bits CTL0, CTL1, CTL2, and CTL3 transmitted over video channels of a conventional TMDS link) or over one or more channels not employed for video transmission. Or, the warning can be a signal transmitted other than over the link, either by the transmitter or another system or entity. Or, the absence of an expected control signal suffices as a warning to the receiver. In some implementations, the receiver must also be provided with an indication when video transmission over the link has actually stopped.

The video clock employed by the transmitter and receiver is preferably left active for a predetermined time commencing at the start of each period of mute mode operation, where the predetermined time is such that the clock will remain stable and accurate during said predetermined time without adjustment of the clock. Thus, the clock will remain active throughout the entire mute period (if the duration of the mute period is not greater than the predetermined time) or the clock will stop during the mute period (if the duration of the mute period is exceeds the predetermined time). Whether or not the video clock remains active during the entire mute mode, the receiver and transmitter should not assume that the video clock is present during mute mode operation, and neither the receiver nor the transmitter should change or lose state if it is not.

When the transmitter and receiver include cipher engines (each cipher engine including a cipher state machine), during the mute mode, operation of the cipher state machines in both the transmitter and receiver should freeze, and the outputs of the cipher engines should be driven to "black" or to another predetermined state (such as one indicative of any predetermined color, image, program, or effect) or the outputs of the cipher engines are otherwise hidden or suppressed.

Each transition from mute mode to transmission mode (to restart the transmission of video or other data) essentially follows the steps for a transmission mode to mute mode transition in reverse. First, a re-connect warning (a warning that a mute mode to transmission mode transition should occur) is asserted to the transmitter (e.g., it is asserted to a pin of the transmitter or loaded as one or more control bits to a register or similar element in the transmitter). The re-connect warning indicates to the transmitter that it should re-connect to the data source. The re-connect warning can be a different register bit (or can be asserted to a different pin) than the "mute" warning that triggers a transmission mode to mute mode transition, or it can simply be a de-assertion or re-assertion of the mute warning. In response to the re-connect warning, the video source is re-started and stabilized if necessary (e.g., a host re-starts the data source and waits until it is stable). This may take significant time if the clock was stopped during the mute period or if the clock frequency changed significantly during the mute period. Whatever re-connection mechanism is employed, once the data source is active and stabilized and the transmitter is re-connected with the data source, the transmitter observes the incoming data stream to identify an appropriate packet boundary thereof, and resumes data transmission over the link commencing at the identified packet boundary. In some implementations, the transmitter also transmits a warning to the receiver that it is resuming (or will soon resume) data transmission over the link.

In embodiments in which frames of video data are transmitted over the link during the transmission mode, while the transmitter observes the first frame (or frames) from the video source (after a mute mode to transmission mode transition, but before resumption of transmission over the link), neither the transmitter nor receiver should change state in a manner that depends on the polarities of the sync signals transmitted with the video because these polarities may have changed during the mute period. The transmitter must take note of any such polarity change during the period in which it observes video from the source (before it resumes transmission of video over the link to the receiver), since this is necessary in order for the transmitter to accurately find the necessary frame boundary at which video transmission is to commence. Thus, the output of the cipher engine (if any) in the transmitter and the cipher engine (if any) in the receiver should continue to be blacked out (or driven to another predetermined state) for up to one frame period (or more than one frame period) while the transmitter observes video from the source (before resumption of video transmission over the link). Optionally, when the content-protection circuitry (if any) in the transmitter and receiver has resumed normal operation and video transmission over the link has resumed, the transmitter acknowledges to the host device that video transmission has resumed.

When the transmitter receives input data from a source, the transmitter must be implemented so that it can identify, sufficiently accurately and reliably, the appropriate packet boundaries in the input data (the packet boundary at which data transmission is to cease at the start of the mute mode, and the packet boundary at which data transmission is to resume at the start of the transmission mode). By the time that logic circuitry in a transmitter can identify such a boundary in a stream of input data, it is typically too late for the logic circuitry to cause the transmitter to perform all operations necessary to resume data transmission over the link (commencing at the first identified boundary), to encrypt data (commencing at the first identified boundary) and resume encrypted data transmission over the link (commencing at the first identified boundary), or to cease encryption and transmission of data (at the first boundary after receiving a warning). Therefore, some embodiments employ a transmitter that is configured to predict the relevant packet boundary (e.g., by counting pixels or lines, or some combination thereof, of the input data), to delay the input data slightly (before encrypting and/or transmitting the input data) while identifying the relevant packet boundary of the data being delayed, or to use some a priori knowledge of the order or protocol of the input data (or some similar mechanism) to identify the relevant packet boundary.

In embodiments in which frames of video data are transmitted over the link during the transmission mode, the video to be transmitted after a mute period can have different timing (e.g., pixel rate, HSYNC frequency, VSYNC frequency, and duration of the active video portion of each line as indicated by a DE signal) and thus different resolution than the video transmitted before the mute period. In preferred implementations, the transmitter remembers the timing of the data transmitted just before the start of a mute period (e.g., stores data indicative of the timing in one or more registers), observes the timing of new input data received (e.g., from a host device) just before the end of the mute period (just before resuming transmission over the link), and then generates artificial timing signals from the timing parameters at the two transition times (e.g., by interpolating between the timing parameters just before the beginning and just before the end of the mute period). At the end of the mute period, the transmitter transmits data with timing determined by the artificial timing signals (at least during an initial transitional period commencing at the end of the mute period). For example, the artificial timing signals can be generated so as to change gradually the timing parameters of the data transmitted during an initial transitional period (commencing at the end of the mute period) from "pre-mute period" values to "post-mute period" values. Or, artificial timing signals can be generated to cause the transmitter to transmit data (after the mute period) with "pre-mute period" timing parameters until the last possible moment, and thereafter with the "post-mute period" timing parameters (thus executing a clean transition to the new timing state). The latter implementation has the advantage of avoiding transmission (over the link) of video data having non-standard (interpolated) timing values which might confuse a video display device.

BRIEF DESCRIPTION OF THE DRAWINGS

FIG. 5 is a table of values employed by module 82 of FIG. 3 to operate on the values asserted thereto by module 81.

DETAILED DESCRIPTION OF THE PREFERRED EMBODIMENTS

Figure 1:
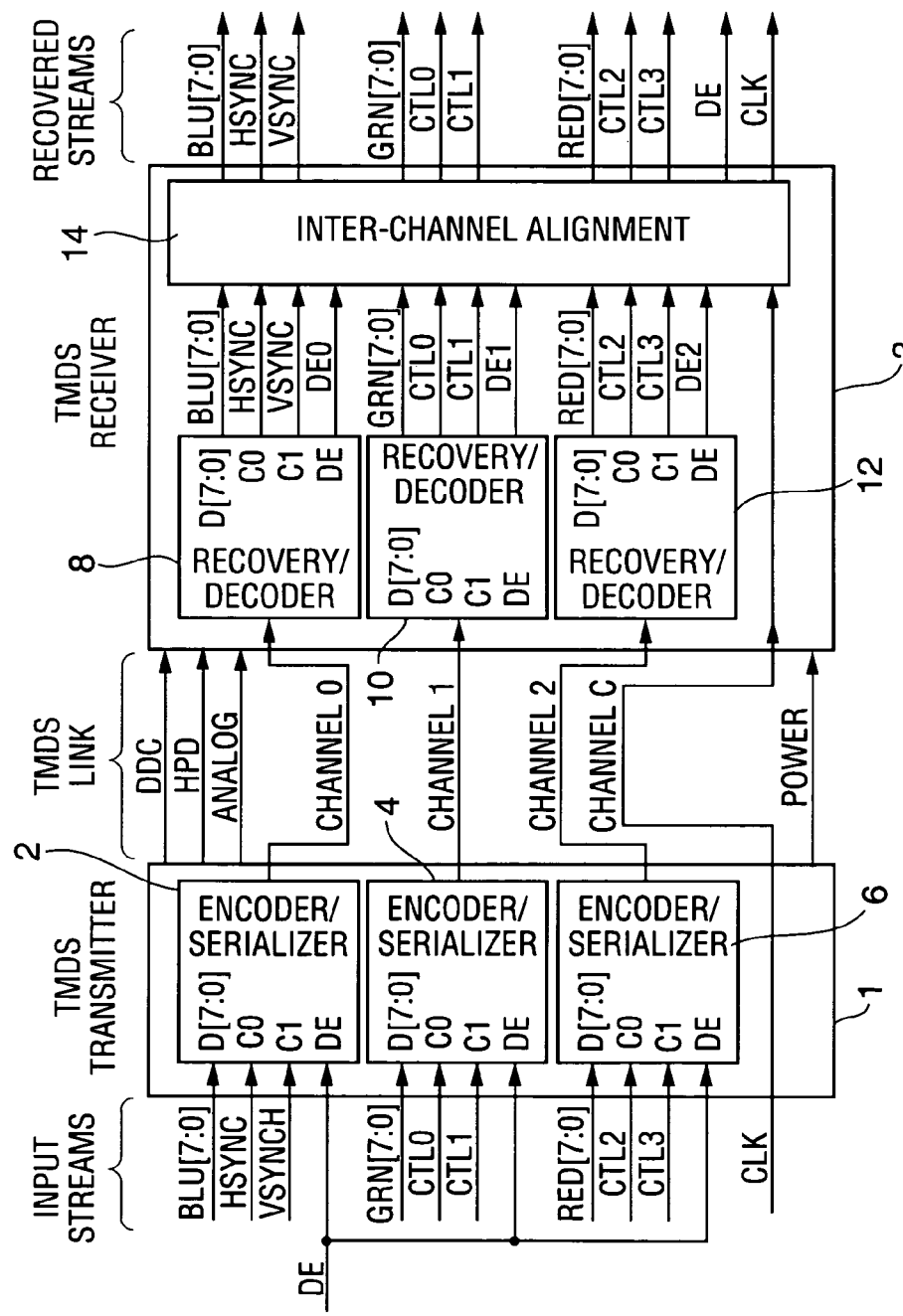
FIG. 1 is a block diagram of a conventional system including a Digital Video Interface ("DVI") link.
Figure 2:
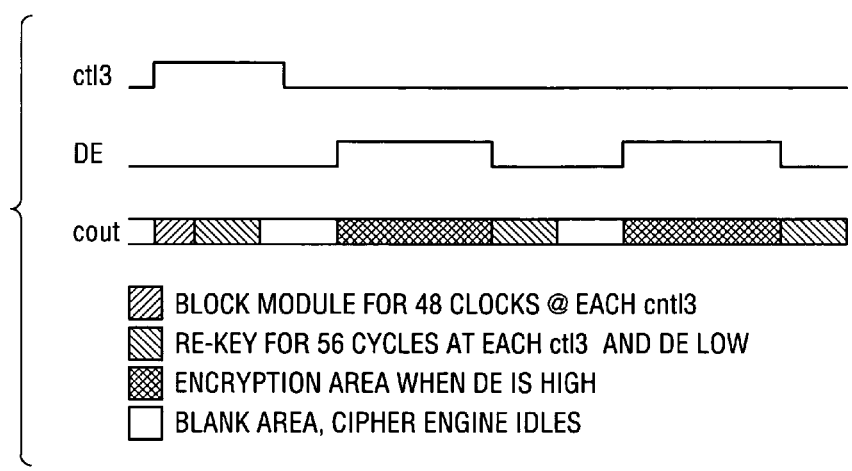
FIG. 2 is a timing diagram of signals generated conventionally to encrypt digital video data to be transmitted over a DVI link using the High-bandwidth Digital Content Protection ("HDCP") protocol.
Figure 3:
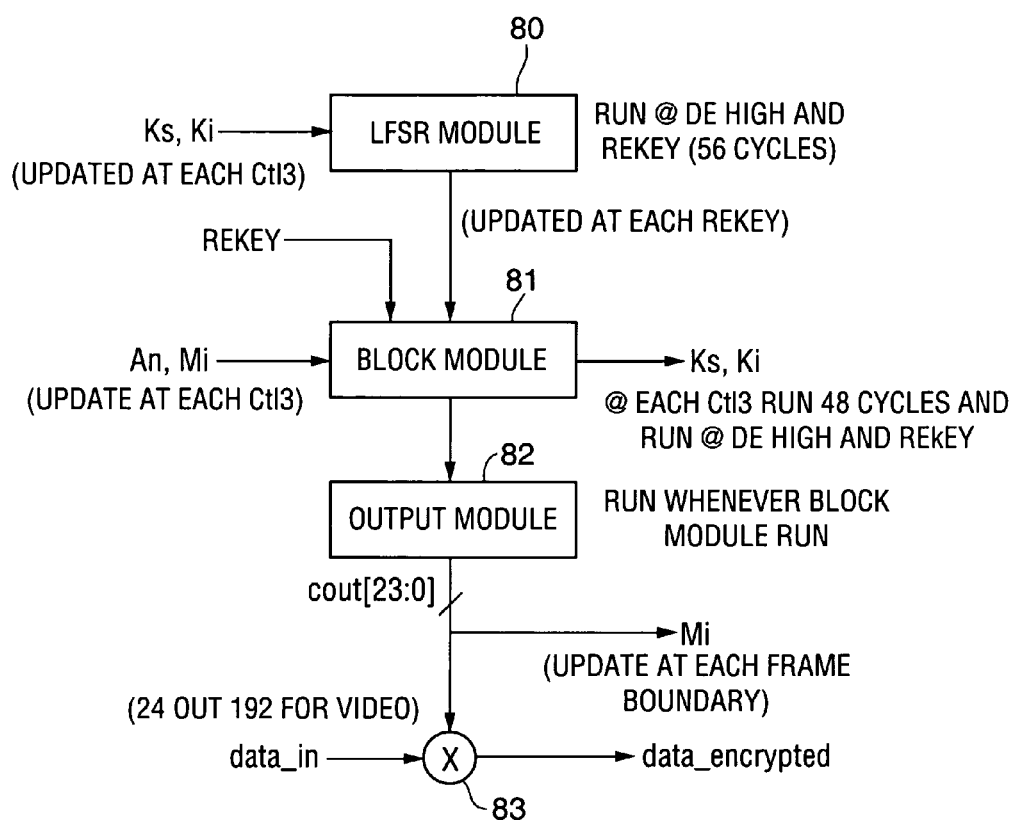
FIG. 3 is a block diagram of conventional circuitry for encrypting digital video data to be transmitted over a DVI link.
Figure 4:
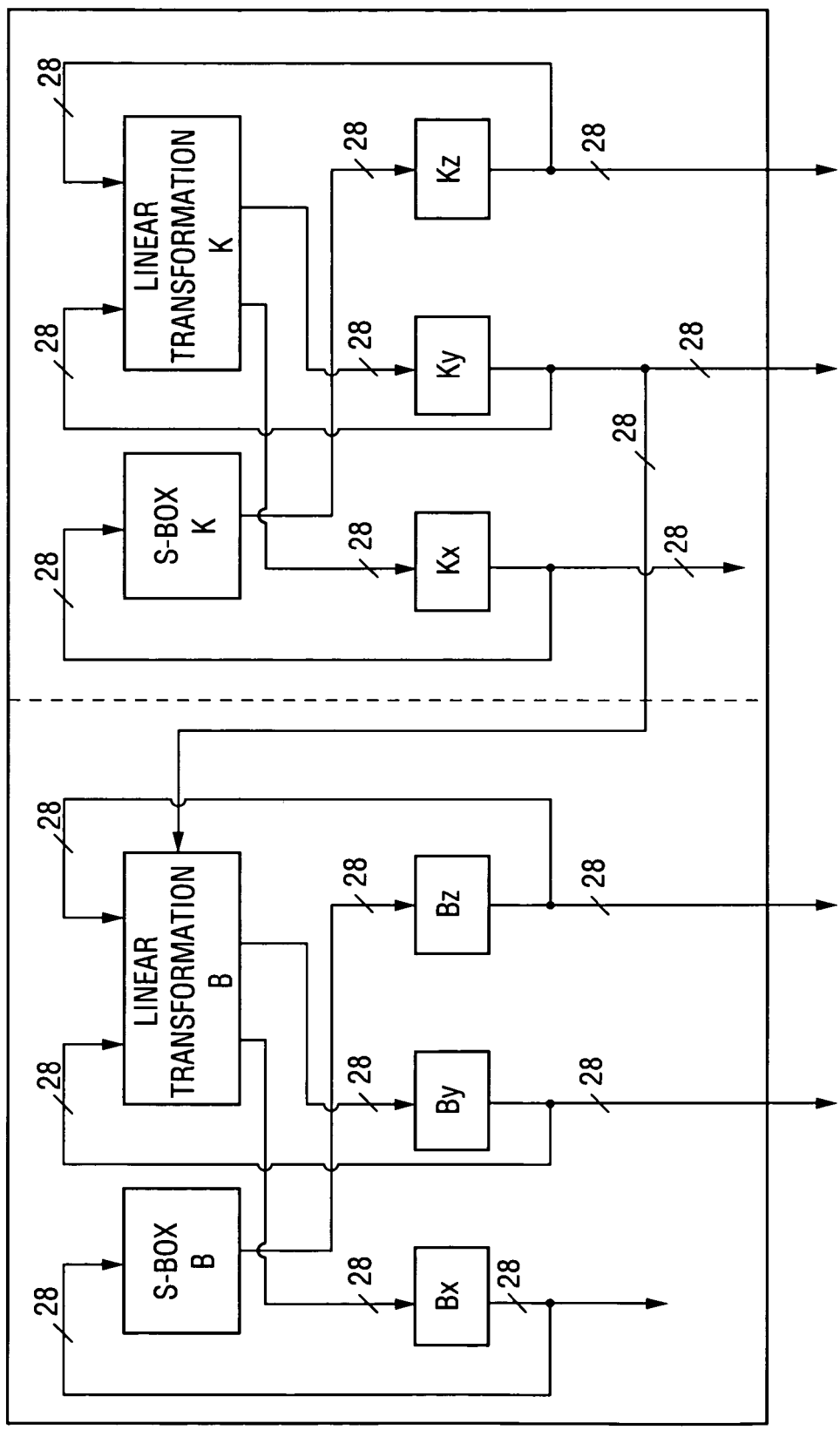
FIG. 4 is a simplified block diagram of module 81 of FIG. 3.

The term "packet" is used herein in a broad sense to denote a frame or other quantity of serially transmitted data that includes a data structure (or one or more signals) indicating a beginning of the packet and optionally also a data structure (or one or more signals) indicating an end of the packet. For example, a conventionally defined "frame" of video data is a "packet" of the video data. Similarly, a "frame boundary" between two frames of video data transmitted consecutively over a serial link is an example of a "packet boundary" between consecutively transmitted packets of data.

The term "transmitter" is used herein in a broad sense to denote any unit capable of transmitting data over a serial link (and optionally also encoding and/or encrypting the data to be transmitted). The term "receiver" is used herein in a broad sense to denote any unit capable of receiving data that has been transmitted over a serial link (and optionally also decoding and/or decrypting the received data). Unless otherwise specified, the serial link can, but need not, be a TMDS-like link. For example, the term transmitter denotes a transceiver that performs the functions of a receiver as well as the functions of a transmitter.

In another example, the term transmitter denotes a processor programmed with software for implementing a variation on the HDCP protocol to communicate with a graphics controller (with the graphics controller functioning as a "receiver") over a serial link. Such a processor can send video data to the graphics controller after executing an authentication exchange in accordance with the relevant version of the HDCP protocol. The processor and graphics controller can be elements of a personal computer configured to send encrypted video data from the graphics controller to a display device. The graphics controller and display device can be configured to execute another encryption protocol (e.g., the standard H)CP protocol discussed above) to allow the graphics controller (this time functioning as a "transmitter") to encrypt video data and send the encrypted video to the display device, and to allow the display device (functioning as a "receiver") to decrypt the encrypted video.

The term "stream" of data is used herein to denote data that are all of the same type and are transmitted with the same clock frequency, and the term "channel" is used herein to denote that portion of a TMDS-like link (or other serial link) that is employed to transmit data (e.g., a particular conductor or conductor pair between the transmitter and receiver over which the data are transmitted, and specific circuitry within the transmitter and/or receiver used for transmitting and/or recovery of the data) and to the technique employed to transmit the data over the link.

When transmitting data via a serial link, is it often desired to transmit multiple streams of the data, and it is often valuable for multiple channels of the link to be available for transmission of the data streams. For example, two audio streams (left and right streams of stereo audio) can be transmitted with a video data stream, or streams of non-audio auxiliary data (e.g., for providing non-audio effects that are synchronized to video) can be transmitted with audio and video streams.

In a class of embodiments, the invention is a communication system that includes a transmitter, a receiver, and a TMDS-like link (or other serial link) and is capable of transmitting video data and optionally also audio data (and/or other auxiliary data) over the link. The transmitter and receiver are operable in any selected one of a video mute mode (in which transmission of video over the link is interrupted) and a video transmission mode (in which video data are transmitted over the link from the transmitter to the receiver). In typical implementations of the video transmission mode, the video data are transmitted in encrypted form over the link and decrypted by a cipher engine in the receiver. Other aspects of the invention are transmitters and receivers for use in such systems, and cipher engines for use in such transmitters or receivers. Other aspects of the invention are methods implemented by any of the embodiments of the inventive system and apparatus.

Expressions employed herein include the following:

Advanced Encryption Standard (or "AES"): A cryptographic algorithm (sometimes referred to as the "Rijndael" algorithm) specified by a recent Federal Information Processing Standards (FIPS) Publication, for use by U.S. Government organizations to protect sensitive information. The National Institute of Standards and Technology (NIST) has indicated that it anticipates that the AES algorithm will be widely used on a voluntary basis by organizations, institutions, and individuals.

Router: A device that receives encrypted content (e.g., digital data) and forwards the content, or receives encrypted content, decrypts (or otherwise modifies or translates) the encrypted content, and then forwards the translated (e.g., modified) content.

Translating Router: a router that decrypts, modifies, or otherwise translates encrypted data to produce translated data, and then forwards the translated data. The translation can include re-encryption.

Content Authority: A system, organization, or other entity responsible for approving the designs of receivers, certifying their compliance with a set of predetermined criteria, assigning an identifier to each approved receiver, and typically also registering public keys for approved receivers. A content authority typically also keeps a list of receivers (or categories of receivers) that are known to be compromised, and provides a certificate and revocation database.

Ticket: Data, delivered to a transmitter or receiver (e.g., by a content authority, or by a content owner after consulting a content authority) in response to an associated request, that enables the receiver that receives the ticket (or a receiver that is coupled to the transmitter receiving the ticket) to decrypt an encrypted version of content specified in the request. A ticket contains each key necessary for decrypting the content (or it enables the receiver to obtain each such key), but the ticket itself (or one or more keys or other elements of the ticket) itself is optionally encrypted. Typically, a ticket is valid only when used by a specific receiver, and optionally only during a specific time interval.

In cryptography, encryption and decryption most often occur at different times (this is known as "asynchronous" operation), which requires that some kind of synchronization is included in the message transmitted over the link. This can be accomplished by transmitting a data structure (or signal) indicating the start of a message, or by transmitting special characters or sub-messages. "Instantaneous" links (or links with known or predictable delays) can be implemented to operate asynchronously in this way, but they can alternatively be implemented to operate "synchronously" so that the encryption and decryption happen at the same time (in the logical sense). Synchronous operation requires use of some mutual, external time reference that signals both sides when to start. A TMDS (or DVI) link is configured to provide such a mutual, external time reference to both sides of the link, and thus can be implemented to accomplish encryption and decryption synchronously, asynchronously, or both synchronously and asynchronously (simultaneously, so that one verifies the other, or for different types of data). For example, synchronous operation can be used for encrypting and decrypting video data transmitted over the link (since video data transmission includes transmission of handy timing references), and asynchronous operation can be used for encrypting and decrypting audio data transmitted over the link (since audio data transmission may not include transmission of timing references).

In some embodiments of the invention that employ a symmetric content protection protocol, the encryption unit on one side of the link works in unison with the decryption unit on the other side of the link. In other embodiments, encryption and decryption occur asynchronously. In all practical embodiments, the system must be implemented in such a manner that the decryption unit knows when to start decryption. Preferably, the system is implemented so that both sides of the link know whether the encryption and decryption processes are working properly.

Synchronous encryption and decryption can be implemented in any of several ways. Prior arrangement is one choice (for example, to encrypt and decrypt video data, the first full vertical sync pulse of the unencrypted video can be used as a reference by the encryption unit, and the first full vertical sync pulse of the encrypted video can be used as a reference by the decryption unit). Another choice is a handshake of some sort (e.g., to encrypt and decrypt video data, the encrypting unit and decrypting unit can exchange information and agree that the next sync pulse will be the reference). Preferably, synchronous operation is established with a handshake, since a handshake can be arranged to accommodate any setup time needed and can be easily repeated.

Figure 6:
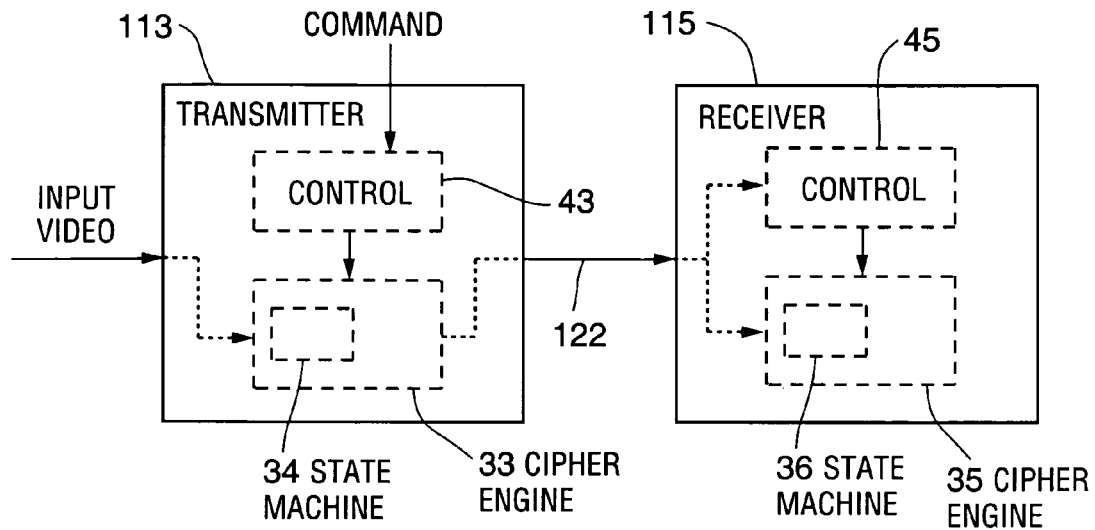
FIG. 6 is a block diagram of a system that can be implemented in accordance with the present invention.

In a class of embodiments, the invention is implemented by a system of the type shown in FIG. 6. The FIG. 6 system includes transmitter 113, receiver 115, and serial link 122 between transmitter 113 and receiver 115. Transmitter 113 includes cipher engine 33 (including state machine 34) and control circuitry 43, connected as shown. Receiver 115 includes cipher engine 35 (including state machine 36) and control circuitry 45, connected as shown. Cipher engine 33 encrypts input video (from an external source) for transmission to receiver 115 over link 122, and cipher engine 35 (which can be identical to cipher engine 36) decrypts the encrypted video received over link 122. In a variation, transmitter 113 itself is the source of the input video that is encrypted by cipher engine 33. In a typical implementation of FIG. 6, transmitter 113 is a set-top box having at least one user-actuatable control (e.g., a "video channel" control that can be actuated to select a different video program for transmission over link 122, or a video mute control that can be actuated to select mute mode operation), and control circuitry 43 is configured to treat a "command" (indicated in FIG. 6) resulting from user actuation of the control as assertion of the inventive "warning" and to trigger mute mode operation of the system in response to such warning. In response to the warning asserted to transmitter 113, control circuitry 43 asserts (with appropriate timing) a warning over link 122 to receiver 115 in a manner to be described in greater detail with reference to FIG. 7. Control circuitry 45 responds to the warning from transmitter 113 by causing cipher engine 35 to enter mute mode operation, in a manner to be described in greater detail with reference to FIG. 7.

Figure 7:
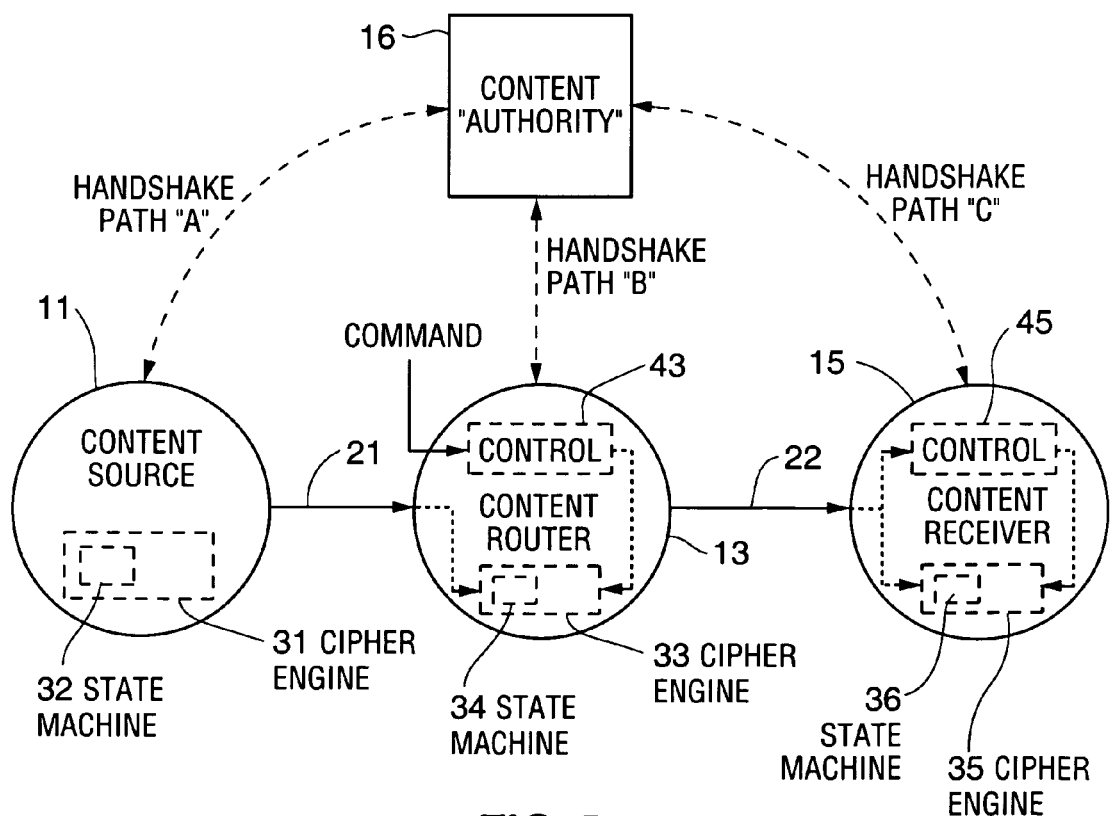
FIG. 7 is a simplified block diagram of another system that can be implemented in accordance with the present invention.

In another class of embodiments, the invention is implemented by a system having the architecture shown in FIG. 7 (or a variation on such architecture), with a content delivery path that includes at least one serial link between a transmitter and a receiver. The FIG. 7 system includes content source 11, router 13 (including control circuitry 43 and cipher engine 33), and receiver 15 (including control circuitry 45 and cipher engine 35), link 21 between source 11 and router 13, link 22 between router 13 and receiver 15, and content authority 16 (an external agent). A handshake path connects each of source 11, router 13, and receiver 15 to content authority 16. Cipher engines 33 and 35 (and state machines 34 and 36 thereof), control circuitry 43, and control circuitry 45 of FIG. 7 can be identical to the identically numbered elements of FIG. 6, and at least one of links 21 and 22 can be identical to serial link 122 of FIG. 6.

The term "connected" is not used herein to denote "connected all the time" (continuously connected). In some embodiments, a transmitter (or receiver) is continuously connected to an external agent. However, in other embodiments that include an external agent, neither the transmitter nor receiver is connected continuously to the external agent. For example, connection to the external agent can occur at installation (or "registration") time, or it can occur whenever there is a change in the system, or at regular intervals, or with each use.

Content source 11 of FIG. 7 functions as a transmitter to transmit encrypted data to receiver 15 (optionally via router 13), and can be a satellite receiver, a DVD disk player, a source of encrypted video and audio data to be stored on a DVD disk, an audio or video server on the internet, or another source of the encrypted data. Receiver 15 is the final destination of the encrypted data, and is configured to decrypt the encrypted data that it receives. Receiver 15 can be a TV set, a portable MP3 player, an information kiosk, a printer, or another final destination for the received data.

Content router 13 is coupled between content source 11 and receiver 15. In variations on the FIG. 7 system that embody the invention, content router 13 is omitted and encrypted data is transmitted from content source 11 directly to receiver 15 over a serial link rather than via router 13. In other variations on the FIG. 7 system that embody the invention, two or more content routers are coupled between source 11 and receiver 15, with the number of content routers depending on the distance and the structure found between the source and the receiver.

There are several different communication paths in the FIG. 7 system. A delivery path including link 21 (from content source 11 to router 13) and link 22 (from router 13 to receiver 15) transfers the actual encrypted content, and typically comprises high-bandwidth (although not necessarily continuous) connections. For example, link 21 can be a DVD disk (in which case content router 13 is a DVD disk player) or an internet connection that downloads content overnight to content router 13 and then disconnects (in this case, content router 13 is a set-top box having capacity to store the downloaded data). Link 22 can but need not be implemented using the same technology as link 21. For example, link 21 can be a satellite or cable or internet link, and link 22 a DVI link or other TMDS-like link. For another example, link 21 can be a serial ATA link, and link 22 a P1394 (FireWire) connection.

In many implementations of the FIG. 7 system, it is logical and practical to record or otherwise store the encrypted content at at least one point along the content delivery path (e.g., in at least one of source 11, router 13, receiver 15, and links 21 and 22). For example, content source 11 (or router 13, or each of source 11 and router 13) can include a hard-disk drive so that the content can be kept there in an encrypted and secure state until receiver 15 wishes to access it.

The FIG. 7 system includes handshake path A between source 11 and content authority 16, handshake path B between router 13 and content authority 16, and handshake path C between receiver 15 and content authority 16. The handshake paths are typically used to establish the content delivery path, and to provide the information necessary to cryptographically protect the delivered content. Because the handshake messages will typically be small and transitory, the handshake paths can typically be implemented as simple and slow links. For example, the handshake paths can be implemented as internet (dial-up or otherwise) connections, telephone calls, email messages, bar-code scans, password entries, smart-card transactions, I²C or USB interfaces, or some combination of these and others. The information transfer over each handshake path can occur once or occasionally, and the results can be stored for later use.

In some embodiments, both handshake paths A and C are required, and optionally handshake path B is also present. However, paths A and C (or A, B, and C) need not be separate. For example, all direct communication with content authority 16 can be through one of units 11, 13, and 15 (with the other units communicating indirectly with content authority 16). Although a transaction to be implemented over handshake paths A and C can be initiated by either source 11 or receiver 15, both source 11 and receiver 15 must ultimately synchronize their efforts to accomplish the handshake transaction. Handshake path B is required in some implementations of the FIG. 7 system (e.g., those in which router 13 translates or otherwise changes the data in some way) but not in other implementations of the FIG. 7 system (e.g., those in which router 13 merely forwards the data it receives without translating or changing the data in any way).

If router 13 is implemented as a "forwarding router" (a router whose function is merely to forward content without otherwise processing the content in any way) then router 13 need not know what the content is, should not be provided with the key required for altering or reading the content, should be prevented from substituting different content for that which it receives (e.g., by ensuring that the original content asserted from source 11 is securely "signed" by source 11), and need not communicate with content authority 16. In implementations in which router 13 is a forwarding router, router 13 should be configured to ensure that the data forwarded thereby remain encrypted and safe, and the system is preferably configured to be capable of detecting any loss by router 13 of the data asserted thereto and to take corrective action in the event of such loss.

In a class of embodiments, router 13 is a "translating" router which decrypts the encrypted data it receives, processes the decrypted data in some way, and then re-encrypts the processed data (and optionally also re-packaging the processed data) and sends the re-encrypted data to receiver 15. In order to perform such operations, the translating router typically communicates with content authority 16, for example to obtain two keys (one key for decrypting the data, and another for re-encrypting the data) or one key (for decrypting and re-encrypting data). Consider the case that router 13 is a translating router implemented as a set-top box, link 21 is a satellite link, and delivery link 22 is a TMDS-like link (e.g., a TMDS or DVI link). The satellite link typically transmits compressed audio and video on many channels, whereas the TMDS-like link typically transmits a single channel of non-compressed video (and perhaps audio). The set-top box includes a decoder that translates data (e.g., by expanding it, such as from MPEG2 compressed form to non-compressed form) from one selected channel of the satellite link into the necessary format for transmission over the TMDS-like link. The set-top box could also perform other processing on the data (in addition to expansion). For example, the set-top box could scale the picture to a different size (or aspect ratio) or add text overlays for instructions or programming guides. In order to perform any of these operations, the translating router would first decrypt the encrypted data from link 21, then process the decrypted data, and then re-encrypt the processed data.

Some implementations of the FIG. 7 system (or variations thereon) embody the invention and include a serial link (e.g., one of links 21 and 22) between a transmitter-receiver pair (e.g., router 13 and receiver 15) operable in a video mute mode in accordance with the invention. The system optionally includes one or more routers, any of which can but need not be a translating router. In some such implementations, the transmitter and receiver use a content protection protocol employing the above-mentioned AES algorithm (or a content protection protocol employing any of the well known RSA, DES, or MD5 algorithms, or another content protection protocol) to encrypt video data transmitted over the serial link. For example, content source 11 sends encrypted, compressed data (e.g., video data) over link 21 (which can be a cable or satellite link, or another link) to router 13 (implemented as a translating router), and router 13 sends the encrypted, compressed data (or a processed and repackaged version thereof) over link 22 (implemented as a serial link) to receiver 15. At least one key (which can be included in a quantity of ticket data to be referred to as a "ticket") for use in decrypting the data is also transmitted to receiver 15 (by content authority 16, in preferred implementations). In a typical implementation, receiver 15 uses each such key to decrypt the compressed data, and then expands the decrypted compressed data, and displays the expanded data. Typically, receiver 15 sends a ticket request to content authority 16 over handshake path C. In response, content authority 16 either rejects the request, or grants the request. When content authority 16 grants the request, it sends an appropriate ticket to receiver 15.

It can be useful to think of unit 15 as a cohesive unit (a single "receiver"), with all the electronics (typically including a display) integrated into this unit. However, a typical consumer electronics implementation, receiver 15 includes two or more separate units (e.g., at least one "set-top box" and a display device) coupled together by interconnects, and these units function as a "distributed" receiver. Typically, a link between set-top box and display in a distributed receiver carries video in its simplest (uncompressed) form.

In preferred implementations, the serial link between the inventive transmitter and receiver is synchronous, which means that the encryption operations at one end of the link and the decryption operations at the other end are essentially simultaneous. Proper data transmission can only occur if the two sides establish and maintain proper synchronization. A real-time reference is required for synchronous operation. This reference must retain its relationship to the data at each end, even if there is a small (but finite and constant) latency involved. Moreover, this reference must be readily distinguishable at each end of the link. The clock signal conventionally transmitted over a TMDS link is synchronous with the data transmitted over the TMDS link. (Strictly speaking, the clock signal transmitted over a TMDS link is a frequency reference only. It does not control or determine when the transmitted data are sampled, and each of the three data channels in the link must separately decide when to sample the data transmitted over such channel, for maximum skew tolerance.) Such a clock signal can be used as the real-time reference for synchronous encryption and decryption where appropriate, and it does mark the division between pixels, but it is not sufficient for this purpose in all cases. In some cases, the real-time reference value must enable the encryption (and decryption) circuitry on both sides of the link to begin or end an operation at a specific point in time.

The position and width of the video synchronization signals employed by encryption and decryption circuitry on both sides of a synchronous TMDS-like link (in some embodiments of the inventive system) can vary slightly from one frame of video data to the next, due to synchronization errors and specifics of the TMDS-like link. The position and width of the video synchronization signals can also vary significantly in position and width from one video mode to another. Therefore these signals are not used as a critical timing references, but only for operations that have less critical timing.

In a class of embodiments, the invention is a system having the FIG. 7 architecture with router 13 implemented as a translating router and link 22 implemented as a serial link. In a video transmission mode ("transmission mode"), unit 13 of such system receives encrypted video from source 11, decrypts the encrypted video, encodes the decrypted video, re-encrypts the encoded video, and transmits the re-encrypted, encoded video to receiver 15 over link 22. Unit 13 in each such embodiment is also operable in a video mute mode ("mute mode"), and thus functions as the inventive transmitter (and will be referred to as a "transmitter"). During the transmission mode, receiver 15 decrypts and decodes the video received from transmitter 13. Receiver 15 are also operable in a mute mode.

In another class of embodiments, the invention is a system having the FIG. 7 architecture with each of links 21 and 22 implemented as a serial link, unit 11 functioning as the inventive transmitter, receiver 15 functioning as the inventive receiver, and router 13 functioning as a forwarding router that merely forwards to receiver 15 encrypted video transmitted by source 11. In variations on such embodiments, unit 11 functions as the transmitter, router 13 and link 22 are omitted, and link 21 extends between units 11 and 15. When unit 11 functions as the inventive transmitter, it typically includes a subsystem that stores or generates unencrypted video source data (or receives video source data from another source, not shown in FIG. 7), and another subsystem (selectively operable in either a transmission mode or a mute mode) that encodes and encrypts the source data and transmits the encoded, encrypted video data over link 21.

In accordance with the invention, video data transmission over a serial link (e.g., link 122 of FIG. 6, or one or both of links 21 and 22 of FIG. 7 implemented as a serial link) is interrupted in a clean fashion and then resumed in a clean fashion. The transitions between mute and transmission modes occur only at video frame boundaries, in such a manner that sync and other control signals transmitted with (or as part of) the video do not undergo processing glitches, and do not occur at incorrect times, fail to occur at correct times, or cause unintended operations as a result of the transitions.

Each transition from transmission mode operation to mute mode operation in accordance with the invention requires that the device undergoing the transition has prior information that the transition will occur. For a transmitter (e.g., transmitter 113 of FIG. 6), this can be accomplished by asserting a control signal to a pin of the transmitter (e.g., a pin of an integrated circuit implementation of transmitter 113) or by loading one or more control bits to a register or similar element in the transmitter. Such a control signal, control bit, or set of control bits will sometimes be referred to herein as a "warning" or "warning signal." In response to a warning, the transmitter waits for the next frame boundary (or more generally, for the Nth frame boundary after the warning) before entering the mute mode. If the transmitter receives the warning at a frame boundary, it preferably waits for the next frame boundary (or the Nth frame boundary after the boundary at which the warning occurs) before entering the mute mode. In preferred embodiments in which the transmitter encrypts video and transmits encrypted video during the transmission mode, the transmitter responds to a warning by completing encryption of the current frame (and any other frame to be encrypted and transmitted before entry into the mute mode) including by performing any required re-keying, but the transmitter is not allowed to transmit any signal that affects any subsequent frame (i.e., any frame that occurs after entry into the mute mode). In some embodiments of the invention, the transmitter does not encrypt video and transmits encrypted (rather than encrypted) video during the transmission mode.

Typically, a warning is a binary signal that is considered to be "asserted" when it has a first value, and de-asserted when it has the complementary value. In response to assertion of a such a warning to a transmitter (configured to encrypt video and transmit the encrypted video) and a receiver (configured to decrypt encrypted video received from the transmitter), the cipher state machines in both the transmitter and receiver enter a video mute state in which each cipher state machine freezes and the outputs of the cipher engines that include the state machines are driven "black" (or the outputs of the cipher engines are driven to another predetermined state, such as one indicative of any predetermined color, image, program, or effect). It is often desirable to drive the outputs of the cipher engines to "black" in the mute state since this is typically easy to do and effective, but alternatively they could be driven to display another predetermined color instead, or even a simple text message (such as "Mute") or graphic of some kind. In response to the next assertion of such a warning to the transmitter and receiver, both the transmitter and receiver (including their cipher state machines) exit the video mute state. Alternatively, the warning has a first characteristic (e.g., a first value) that causes each recipient (transmitter or receiver) of the warning to enter the mute mode (so that the cipher state machine, if any, in the recipient enters a video mute state), and a different characteristic (e.g., a second value) that causes each recipient of the warning to enter the transmission mode (so that the cipher state machine, if any, in the recipient exits the video mute state). Or, one warning signal can be asserted (e.g., over one channel) to trigger entry into the mute mode, and a different warning signal can be asserted (e.g., over a different channel) to trigger a transition from the mute mode to the transmission mode.

In preferred embodiments, a warning is asserted initially to the transmitter and the transmitter then sends a secondary warning (or forwards the original warning) to the receiver at a precisely determined time. In alternative embodiments in which a third party device or entity (external to both the transmitter and receiver) sends each warning to the receiver and transmitter (and to a content source if necessary), assertion of the warnings must be accomplished in a manner ensuring that all warning recipients undergo operating mode transitions with precisely controlled relative timing.

The inventive transmitter (e.g., transmitter 113 of FIG. 6) is preferably prevented from transmitting any sync signal (e.g., any HSYNC, VSYNC, or DE signal) over the serial link (e.g., link 122 of FIG. 6) during mute mode operation. Preferably also, the output of the inventive transmitter does not change in response to any input video asserted to the transmitter from an external source during mute mode operation. When the transmitter receives a warning while operating in the transmission mode (e.g., as a result of user actuation of a video mute control or video channel change control of transmitter 113 of FIG. 6, or of unit 13 of FIG. 7 when unit 13 functions as the inventive transmitter), the transmitter waits for the appropriate frame boundary and enters the mute mode, and then preferably asserts an acknowledgement to an external video source that it has entered the mute mode. Preferably, the external video source is implemented so that it does not actually interrupt or change the video stream input to the transmitter until receiving the acknowledgement from the transmitter.

In preferred embodiments, the receiver (e.g., receiver 115 of FIG. 6 or receiver 15 of FIG. 7) is also warned of an imminent transmission mode to mute mode transition, and in response the receiver takes appropriate action to accomplish the transition. Minimally, if the receiver decrypts encrypted video received over the serial link (e.g., link 122 of FIG. 6) during the transmission mode, its decryption engine needs to finish work on the current frame (and any other frame to be decrypted before entry into mute mode operation) including by performing any required re-keying. The receiver may also need to save state in some way. The warning to the receiver can be a signal transmitted over the serial link itself (e.g., link 122 of FIG. 6), such as a signal transmitted over the same channel or channels that transmit the video data (e.g., one, or a pattern of more then one, of the control bits CTL0, CTL1, CTL2, and CTL3 transmitted over video channels of a conventional TMDS link) or over one or more channels of the link that are not employed for video transmission. Or, the warning can be a signal transmitted other than over the serial link, either by the transmitter or some other system or entity. In some implementations, the receiver must also be provided with an indication when video transmission over the link has actually stopped.

As shown in FIG. 7, source 11 includes cipher engine 31, router 13 includes cipher engine 33 and control circuitry 43, and receiver 15 includes cipher engine 35 and control circuitry 45. Cipher engine 31 includes state machine 32, cipher engine 33 includes state machine 34, and cipher engine 35 includes state machine 36. When link 22 is a serial link, and router 13 and unit 15 respectively function as the inventive transmitter and receiver, operation of state machines 34 and 36 is preferably frozen during each mute period, and the state of each state machine (as of just before the transmission mode to mute mode transition) is saved. Also, the outputs of cipher engines 33 and 35 are preferably driven to "black" (or to another predetermined state) or are otherwise hidden or suppressed during each mute period. At the appropriate time after the mute period, cipher engines 33 and 35 (including state machines 34 and 36) resume their normal transmission mode operation, respectively by encrypting and decrypting an initial frame commencing at the start of the frame.

With reference to FIG. 7, when link 21 is a serial link and source 11 and unit 13 respectively function as the inventive transmitter and receiver, operation of state machines 32 and 34 is preferably frozen during each mute period (the state of each state machine, as of just before the transmission mode to mute mode transition, is saved). Also, the outputs of cipher engines 31 and 33 are preferably driven to "black" or another predetermined state (or otherwise hidden or suppressed) during each mute period. At the appropriate time after the mute period, cipher engines 31 and 33 (including state machines 32 and 34) resume their normal transmission mode operation, respectively by encrypting and decrypting an initial frame commencing at the start of the frame.

FIG. 7 also shows that control circuitry 43 is coupled to receive a "command" (a warning), that typically results from user actuation of a video mute (or video channel change) control of unit 13. Control circuitry 43 is coupled to cipher engine 33, and control circuitry 45 is coupled to link 22 and to cipher engine 35. The operating mode of cipher engine 33 is controlled by control signals from circuitry 43, and circuitry 43 generates these control signals in response to the warnings that it receives. The operating mode of cipher engine 35 is controlled by control signals from circuitry 45, and circuitry 45 generates these control signals in response to warnings received over link 22.

As noted above, transmitter 113 of FIG. 6 includes control circuitry 43 and cipher engine 33, and receiver 115 of FIG. 6 includes control circuitry 45 and cipher engine 35. The control circuitry and cipher engines of FIG. 6 that are numbered identically to corresponding elements of FIG. 7 can be identical and operate identically to the corresponding elements of FIG. 7, and the above description of their operation (with reference to FIG. 7) will not be repeated with reference to FIG. 6.

With reference to FIGS. 6 and 7, when the transmitter (e.g., unit 113, or unit 13 operating as a transmitter) transmits a video clock to the receiver (e.g., unit 115 or unit 15) over a serial link (e.g., link 122 or 22) along with video data, the clock is preferably left active (and the transmitter can continue to transmit it) for a predetermined time commencing at the start of each period of mute mode operation, where the predetermined time is such that the clock will remain stable and accurate during said predetermined time without adjustment of the clock. Thus, the clock will remain active throughout the entire mute period (if the duration of the mute period is not greater than the predetermined time) or the clock will stop during the mute period (if the duration of the mute period is exceeds the predetermined time). Whether or not the video clock remains active during the entire mute mode, the receiver and transmitter should not assume that the video clock is present during mute mode operation, and neither the receiver nor the transmitter should change or lose state if it is not.

Each transition from mute mode to transmission mode (to restart the transmission of video) essentially follows the steps for a transmission mode to mute mode transition in reverse. First, a re-connect warning (a warning that a mute mode to transmission mode transition should occur) is asserted to the transmitter. For example, the re-connect warning is asserted to a pin of the transmitter or loaded as one or more control bits to a register or similar element in the transmitter. The re-connect warning indicates to the transmitter (e.g., unit 13 of FIG. 7, implemented as the inventive transmitter) that it should re-connect to the video source (e.g., source 11 of FIG. 7). The re-connect warning can be a different register bit (or can be asserted to a different pin) than the "mute" warning that triggers a transmission mode to mute mode transition, or it can simply be a de-assertion or re-assertion of the mute warning. In response to the re-connect warning, the video source is re-started and stabilized if necessary (e.g., a host re-starts the video source and waits until it is stable). This may take significant time if the clock was stopped during the mute period or if the clock frequency changed significantly during the mute period. Whatever re-connection mechanism is employed, once the video source is active and stabilized and the transmitter is re-connected with the video source, the transmitter observes the incoming video stream to identify an appropriate frame boundary thereof, and resumes video transmission to the receiver over the serial link (e.g., over link 22 of FIG. 7) commencing at the identified frame boundary. In some implementations, a warning signal is also transmitted to the receiver (e.g., to receiver 15 from transmitter 13) to notify the receiver that video transmission over the serial link has resumed or will soon resume.

In some embodiments, in order for a receiver to accomplish a transition from mute mode to transmission mode operation, the receiver (while operating in the mute mode) also needs to observe an incoming video stream to identify an appropriate frame boundary thereof. The receiver enters the transmission mode upon identifying the frame boundary and commences decryption at the identified frame boundary. In such embodiments, the transmitter (while operating in the mute mode but after receiving a re-connect warning) may need to transmit nonencrypted video to the receiver for a limited time to allow the receiver to identify a frame boundary, and the transmitter thereafter enters the transmission mode (upon entering the transmission mode, the transmitter commences encryption of incoming video from the source at a frame boundary identified by the transmitter).

While the transmitter (e.g., unit 13 of FIG. 7, implemented as the inventive transmitter, or transmitter 113 of FIG. 6) observes the first frame (or frames) from the video source after a mute mode to transmission mode transition (but before resumption of video transmission over the serial link to the receiver), neither the transmitter nor receiver should change state in a manner that depends on the polarities of the sync signals transmitted with the video because these polarities may have changed during the mute period. The transmitter must take note of any such polarity change during the period in which it observes video from the source (before it resumes transmission of video over the serial link to the receiver), since this is necessary in order for the transmitter to accurately find the necessary frame boundary at which video transmission is to commence. Thus, the encryption circuitry in the transmitter and the decryption circuitry in the receiver should remain in the "off" state for up to one frame period (or more than one frame period) while the transmitter observes video from the source (before resumption of video transmission to the receiver over the serial link). Optionally, when the content-protection circuitry in the transmitter and the receiver (e.g., unit 13 and receiver 15 of FIG. 7) has been re-activated and video transmission to the receiver over the serial link has resumed, the transmitter acknowledges to a host device (e.g., source 11 or a host device that controls source 11) that video transmission has resumed.

The inventive transmitter (e.g., unit 113, or unit 13 operating as a transmitter) must be implemented so that it can identify, sufficiently accurately and reliably, the appropriate frame boundaries in the video data it receives from a source (e.g., source 11), namely the frame boundary at which video transmission to receiver 15 is to cease at a transmission mode to mute mode transition and the frame boundary at which video transmission is to resume at a mute mode to transmission mode transition. By the time that logic circuitry in the transmitter can identify such a boundary, it is typically too late for the logic circuitry to cause the transmitter to perform all operations necessary to resume video transmission over the link (commencing at the first identified boundary), to encrypt video (commencing at the first identified boundary) and resume encrypted video transmission over the link (commencing at the first identified boundary), or to cease encryption and transmission of video (at the first boundary after receiving a warning). Therefore, the transmitter (e.g., unit 113) is typically implemented to predict the relevant frame boundary (e.g., by counting pixels or lines, or some combination thereof, of incoming video from the source), or to delay incoming video from the source slightly (before encrypting it and/or transmitting it) while identifying the relevant frame boundary of the video being delayed (e.g., so that transmitter 113 can resume video encryption and transmission over link 122 when the first pixel of the first frame having an identified boundary reaches a video input of cipher engine 33 after a warning has been received). Alternatively, the transmitter can be implemented to use some a priori knowledge of the order or protocol of incoming video from the source (or some similar mechanism) to identify the relevant frame boundary.

The video to be transmitted after a video mute period can have different timing (e.g., pixel rate, HSYNC frequency, VSYNC frequency, and duration of the active video portion of each line as indicated by a DE signal) and thus different resolution than the video transmitted before the mute period. In preferred implementations, transmitter 113 is configured to remember the timing of the video transmitted just before the start of a mute period (e.g., it stores data indicative of the timing in one or more registers), to observe the timing of new video received from a source just before the end of the mute period (just before resuming video transmission over link 122), and then to generate artificial timing signals from the timing parameters at the two transition times (e.g., by interpolating between the timing parameters just before the beginning and just before the end of the mute period). At the end of a mute period, such implementations of transmitter 113 transmit video with timing determined by the artificial timing signals (at least during an initial transitional period commencing at the end of the mute period). For example, transmitter 113 can be configured to generate the artificial timing signals so as to change gradually the timing parameters of the video transmitted during an initial transitional period (commencing at the end of the mute period) from "pre-mute period" values to "post-mute period" values. Or, transmitter 113 can be configured to generate the artificial timing signals so that transmitter 113 transmits video (after the mute period) with "pre-mute period" timing parameters until the last possible moment, and thereafter with the "post-mute period" timing parameters (thus executing a clean transition to the new timing state). The latter implementation has the advantage of avoiding transmission (over the link) of video having non-standard (interpolated) timing values which might confuse the video display device.

In embodiments of the invention that employ a TMDS link (e.g. link 122 of FIG. 6 implemented as a TMDS link), transmitted sequences of code words (e.g., code words indicative of one or more of the above-mentioned, conventional control bits CTL0, CTL1, CTL2, and CTL3) can also be employed as the above-discussed warning signals. Such warning signals occur infrequently (compared to the video pixel rate) to trigger each "video transmission" to "video mute" mode transition and each "video mute" to "video transmission" mode transition. In some such embodiments, at least one video encryption or decryption operation requires a real-time synchronization signal that is less regular or less frequent than a video HSYNC or VSYNC signal, but still provides precise synchronization of the transmitter with the receiver. For example, transitions to new encryption keys typically occur only vary rarely (compared to the video pixel rate), and yet must take effect at both sides of the serial link at exactly the same pixel. Transmitted sequences of code words (e.g., code words indicative of one or more of the four conventional control bits CTL0, CTL1, CTL2, and CTL3) can also be employed as such infrequently occurring synchronization signals.

Consider a class of embodiments in which link 122 of FIG. 6 is a TMDS (or DVI) link. A sequence of code words (in turn indicative of a sequence of values of the bit CTL3, CTL2, CTL1, or CTL0) transmitted over a video channel of the link during each vertical blanking interval can determine the value of a warning signal and optionally also a synchronization signal. In some such embodiments, circuitry within receiver 115 (e.g., control and synchronization circuitry within the receiver's cipher engine) is configured to determine the number of rising edge transitions of a sequence of CTL3 values and to determine specific values of the warning signal and the synchronization signal from the determined number of edge transitions. During video transmission mode operation, the code words determining the sequence of CTL3 values can be transmitted during one predetermined portion (e.g., in the first line) of each vertical blanking interval. During mute mode operation (when no video data is being transmitted over the link), a sequence of code words determining the sequence of CTL3 values can be transmitted at any time (optionally, following a distinctive header or other distinctive data structure or signal) and the receiver is configured to respond to each such code word sequence.

For example, at least thirty-one but not more than sixty-three rising edge transitions in the values of CTL3 in one line of a vertical blanking interval can indicate to the receiver that the value of the warning signal is a logical one, so that the receiver should undergo a transition from transmission mode to mute mode operation. Less than thirty-one or more than sixty-three rising edge transitions in the values of CTL3 in a line of a vertical blanking interval can indicate that the value of the warning signal is a logical zero (so that no transition into the mute mode should occur). At least fourteen but not more than thirty rising edge transitions in the values of CTL3 in one line of a vertical blanking interval can indicate to the receiver that the value of a "key change" synchronization signal is a logical one (which indicates to the receiver that the next frame of video is the last frame during which the "current" key value will be used) and any number of rising edge transitions outside this range in the line can indicate that the value of the "key change" synchronization signal is a logical "zero." During mute mode operation, at least thirty-one but not more than sixty-three rising edge transitions in the values of CTL3 (e.g., following a distinctive header) can indicate to the receiver that the value of the warning signal is a logical one, so that the receiver should undergo a transition from mute mode to transmission mode operation, and less than thirty-one or more than sixty-three rising edge transitions in the values of CTL3 can indicate that the value of the warning signal is a logical zero (so that no transition out of the mute mode should occur). Optionally, identification of more than sixty-three rising edge transitions in the values of CTL3 in one line of a vertical blanking interval indicates to the receiver that an error has occurred.

Note that there is a significant range in the number of transitions (identified by the receiver) that determine each specific value of each of the warning signal and the synchronization signal. That is because errors can occur during transmission and decoding of the code words indicative of the CTL values (under rare circumstances), and each such glitch can cause the actual number of transitions identified by the receiver to be different than the number that would be identified in the absence of the glitch.

In variations on the described example, circuitry within receiver 115 is configured to determine the number of rising edge transitions of a sequence of CTL3 values (or of a sequence of values of CTL2, CTL1, or CTL0, or combinations of CTL3, CTL2, CTL1, and CTL0), and to determine a specific value of the warning signal only (not also a value of a synchronization signal) from the determined number of edge transitions.

Of course, in any embodiment in which sequences of code words transmitted over a video channel of a serial link (during blanking intervals) determine the value of the inventive warning signal, the code words should not also be transmitted during the blanking intervals for a conflicting purpose. For example, where a sequence of N code words indicative of control bit CTL3 is transmitted to implement a content protection operation (unrelated to a transition into or out of the inventive mute mode), such a sequence of such N code words should not be transmitted to indicate assertion of the inventive warning signal. Instead, a sequence of N code words indicative of control bit CTL2 might as transmitted to indicate the inventive warning signal in this case, if the latter sequence is not also transmitted for a conflicting purpose.

More generally, in some embodiments of the invention a sequence of encoded binary values (a logical "one" being determined by each member of a predetermined set of one or more code words or patterns of code words, and a logical "zero" being determined by each member of another predetermined set of one or more code words or patterns of code words) determines the value of the inventive warning signal (and optionally at least one other synchronization or control signal). During video transmission mode operation, the code words or code word patterns are transmitted during a predetermined blanking interval (e.g., during a predetermined line of each vertical blanking interval, or during one or more horizontal blanking intervals of each frame of the video signal, or during both horizontal and vertical blanking intervals of each frame of the video signal). The number of transitions (e.g., rising edge transitions) in each such sequence of binary values determines a specific value of the warning signal (and optionally also at least one other synchronization or control signal). For example, a sequence of N rising edge transitions of the encoded binary values (indicated, for example by N occurrences of the code word sequence AB, where "A" is a code word of a first type and "B" is a code word of a second type) during one predetermined line of a vertical blanking interval indicates that the warning signal has a first binary value (e.g. "0") if N satisfies L<N<M, where L is an integer, M is an integer greater than L, (M−L)=kN, and k is a predetermined proportionality constant, and that the warning signal has the complementary binary value (e.g. "1") if N≦L, or N≧M.

Preferably, each such range of transitions (e.g., rising edge transitions) that indicates a particular value of a warning signal is sufficiently broad to avoid transmission errors, because the encoded words (e.g., each out-of-band code word that determines a specific value of the bit CTL3) can experience glitches during transmission (typically only under rare circumstances) and this will cause the actual number of transitions seen to be different on both sides of the link.

Thus, in some embodiments, control circuitry 45 of receiver 115 of FIG. 6 is configured to determine the number ("N") of transitions (e.g., rising edge transitions) in a sequence of encoded binary values transmitted during a predetermined portion (e.g., the first line) of each vertical blanking interval of the video received on link 122. This can be done by asserting a sequence of code words (transmitted in the predetermined portion of each vertical blanking interval) to logic within the control circuitry, where the code words are indicative of the encoded binary values. The sequence of encoded binary values (having "N" transitions) is a warning signal having a first value (e.g., a logical "one") if N satisfies L<N<M, where L is an integer, M is an integer greater than L, (M−L)=kN, and k is a predetermined proportionality constant, and having the complementary value (e.g. a logical zero) if N≦L, or N≧M. The control circuitry is also configured to respond to each assertion of the warning signal with the first value (e.g., a logical "one") by initiating a transition from video transmission mode to video mute mode operation. During mute mode operation, the code words determining the sequence of encoded binary values can be transmitted at any time (optionally, following a distinctive header or other distinctive data structure or signal) and receiver 15 is configured to respond to the code words. During mute mode operation (as in transmission mode operation), the sequence of encoded binary values (having "N" transitions) is a warning signal having the first value (e.g., a logical "one") if N satisfies L<N<M, where L is an integer, M is an integer greater than L, (M−L)=kN, and k is a predetermined proportionality constant, and having the complementary value (e.g. a logical zero) if N≦L, or N≧M. The control circuitry is configured to respond to each assertion of the warning signal with the first value by initiating a transition from video mute mode to video transmission mode operation.

Many variations on the described embodiments are contemplated. For example, during transmission of each frame of video in some variations, one or more sequences of code words (in turn indicative of a sequence of binary values of the bit CTL3, CTL2, CTL1, CTL0, or some other control bit) are transmitted, each during a predetermined blanking interval (or portion thereof), to determine the value of a warning signal (and optionally also the value of at least one other control or synchronization signal). For example, one sequence of code words (indicative of a sequence of values of the bit CTL3) is transmitted over one channel of the link during a predetermined blanking interval (or portion thereof) to determine the value of a warning signal, and another sequence of code words (indicative of a sequence of values of the bit CTL2) is transmitted over another channel of the link during a predetermined blanking interval (or portion thereof) to determine the value of another control signal.

In other embodiments, a warning signal is transmitted to at least one of the transmitter and receiver other than as a sequence of code words indicative of a sequence of binary values (where the number of transitions in the latter sequence determines the value of the warning signal).

For example, in a class of preferred embodiments the warning signal is (or is included in) a data structure. The data structure (sometimes referred to herein as a "control packet") indicates to its recipient (either a transmitter or a receiver) that the recipient should execute a transition from mute mode to transmission mode operation (or from transmission mode to mute mode operation). The transmitter can transmit such control packets over the serial link (or in another manner) to the receiver at appropriate times, and a host device (or other entity) can assert such control packets to the transmitter at appropriate times. Each packet optionally includes data or control bits in addition to those that trigger the appropriate mode transition. In embodiments in which the serial link is a TMDS link, the transmitter preferably transmit the control packets on a predetermined channel of the TMDS link, and the receiver is configured to monitor the channel and respond to each control packet transmitted thereon.

In general, it is preferred that each warning signal sent to a transmitter or receiver in accordance with the invention is sent in a manner providing good immunity to noise and precisely controlled synchronization between operation of cipher engines in the transmitter and receiver.

In preferred embodiments of the inventive system, all transmitters that encrypt video data and transmit the encrypted video over a serial link and all receivers that decrypt the encrypted video have video mute capability. All the transmitters and receivers are configured to respond to a warning signal, preferably in a highly deterministic manner, by entering or exiting a video mute mode of operation. Upon entering the video mute mode, the cipher engine of each transmitter and receiver "freezes" in place at the next frame boundary (or more generally, the Nth frame boundary) after the warning. The control and clock signals employed during normal (video transmission) mode operation can be undefined during video mute mode operation, yet they must not affect or alter the cipher state. During video mute mode operation, the data signals output from the cipher engines are preferably driven to a black level (or another predetermined color or state) or otherwise hidden or suppressed. Also preferably, each receiver and transmitter exits the video mute mode (preferably in a highly deterministic manner) upon assertion thereto of another warning signal.

Preferably, a transmitter, receiver, or system configured to implement the present invention is configured to implement more than one (and preferably as many as practical) of the features disclosed herein. The described embodiments are, in general, not exclusive, and in some applications the best performance will be achieved when using some combination of these approaches.

It should be understood that while certain forms of the present invention are illustrated and described herein, the invention is defined by the claims and is not to be limited to the specific embodiments described and shown. For example, although specific embodiments are described herein as being methods or apparatus for temporarily interrupting transmission of frames of video data over a serial link, variations on these embodiments are contemplated in which transmission of packets of audio data (or other data), rather than video data, over a serial link is temporarily interrupted.

What is claimed is:

1. A communication system including:
a transmitter;
a receiver; and
at least one serial link coupled between the transmitter and the receiver, wherein each of the transmitter and the receiver is operable in any selected one of a transmission mode and a mute mode, wherein the transmitter transmits packets of data to the receiver over the link in the transmission mode, transmission of the data over the link is interrupted during the mute mode, and the transmitter and the receiver are configured to undergo transitions between mute mode operation and transmission mode operation in response to warnings, such that the transitions occur only at packet boundaries of the data.

2. The system of claim 1, wherein the transmitter is configured to respond to a warning signal received while operating in the transmission mode, by continuing to transmit the data over the link until the Nth packet boundary after receiving the warning signal and then entering the mute mode before transmitting additional data, where N is a predetermined integer.

3. The system of claim 2, wherein the transmitter saves state upon entering the mute mode.

4. The system of claim 1, wherein the transmitter is configured to respond to a warning signal received while operating in the transmission mode, by continuing to transmit the data over the link until the first packet boundary after receiving the warning signal and then entering the mute mode before transmitting additional data.

5. The system of claim 4, wherein the transmitter saves state upon entering the mute mode.

6. The system of claim 1, wherein the data are video data and the transmitter is configured not to transmit any video synchronization signal over the link while operating in the mute mode.

7. The system of claim 1, wherein the data are encrypted data, the transmitter includes a cipher engine, the receiver includes a second cipher engine, the transmitter is operable in the transmission mode to generate the encrypted data by encrypting first data using the cipher engine, the receiver is operable in the transmission mode to generate decrypted data by decrypting the encrypted data using the second cipher engine, and neither the cipher engine nor the second cipher engine changes state while operating in the mute mode.

8. The system of claim 7, wherein the transmitter is configured to respond to a warning signal received while operating in the transmission mode by allowing the cipher engine to finish encryption of the current packet and then entering the mute mode before transmitting additional encrypted data, and the transmitter is configured not to transmit any signal over the link, while operating in the mute mode, that would affect any packet subsequent to the current packet.

9. The system of claim 7, wherein the receiver is configured to respond to a warning signal received while operating in the transmission mode by allowing the second cipher engine to finish decryption of the current packet and then saving state.

10. The system of claim 7, wherein the encrypted data are encrypted video data and the transmitter is configured not to transmit any video synchronization signal over the link while operating in the mute mode.

11. The system of claim 7, wherein each of the cipher engine and the second cipher engine includes a state machine, wherein operation of the each said state machine is frozen during the mute mode.

12. The system of claim 11, wherein each of the cipher engine and the second cipher engine is configured to assert output data, and the output data of at least the second cipher engine are forced to a predetermined state during the mute mode.

13. The system of claim 12, wherein the output data of each of the cipher engine and the second cipher engine are driven to black during the mute mode.

14. The system of claim 1, wherein the packets of data are frames of encrypted video data, the transmitter and the receiver are configured to undergo the transitions between mute mode operation and transmission mode operation in response to the warnings such that the transitions occur only at frame boundaries of the encrypted video data, the transmitter includes a cipher engine, the receiver includes a second cipher engine, the transmitter is operable in the transmission mode to generate the frames of encrypted video data by encrypting frames of input video data using the cipher engine, the receiver is operable in the transmission mode to generate decrypted video data by decrypting the frames of encrypted video data using the second cipher engine, and neither the cipher engine nor the second cipher engine changes state while operating in the mute mode.

15. The system of claim 1, wherein each of the warnings received by the receiver is determined by a sequence of code words, each of the code words is indicative of a binary bit, each said sequence determines a pattern of binary bits having a number of transitions between adjacent complementary bits, and said number of transitions between adjacent complementary bits is in a predetermined range of numbers.

16. The system of claim 1, wherein the transmitter is configured to transmit at least some of the warnings to the receiver, and each of the warnings transmitted by the transmitter to the receiver is determined by a control packet transmitted by the transmitter.

17. The system of claim 1, wherein the transmitter is configured to transmit at least some of the warnings to the receiver, and the receiver is configured to respond to each of the warnings received from the transmitter by undergoing one of the transitions between mute mode operation and transmission mode operation.

18. The system of claim 17, wherein the packets of data are frames of video data, the transmitter is configured to transmit the frames of video data over at least one video channel of the link during the transmission mode, and the transmitter is configured to transmit each of the warnings that it transmits to the receiver over the at least one video channel.

19. The system of claim 18, wherein the link is a TMDS-like link, each of the warnings transmitted by the transmitter to the receiver is determined by a sequence of transmitted code words indicative of binary control bits, and each said sequence determines a pattern of the binary control bits.

20. The system of claim 18, wherein each of the warnings transmitted by the transmitter to the receiver is determined by a sequence of transmitted code words indicative of binary bits, and each said sequence determines a pattern of the binary bits.

21. The system of claim 17, wherein the packets of data are frames of video data, the transmitter is configured to transmit the frames of video data over at least one video channel of the link during the transmission mode, and the transmitter is configured to transmit each of the warnings that it transmits to the receiver other than over the at least one video channel.

22. The system of claim 1, wherein the data are video data, each of the transmitter and the receiver employs a video clock during the transmission mode, and the video clock remains active for a predetermined time commencing at the start of each period of mute mode operation, where the predetermined time is such that the video clock will remain stable and accurate during said predetermined time without adjustment of the video clock.

23. The system of claim 1, wherein the packets of data are frames of video data, and the transmitter and the receiver are configured to undergo transitions between mute mode operation and transmission mode operation in response to the warnings such that the transitions occur only at frame boundaries of the video data.

24. The system of claim 1, also including:
a source coupled to the transmitter and configured to assert packets of input data to the transmitter, wherein some of the warnings are re-connect warnings, and the transmitter is configured to respond to each of the re-connect warnings received during mute mode operation by accepting a stream of the input data from the source, identifying a packet boundary in said stream, and resuming transmission of the data over the link upon identifying the packet boundary.

25. The system of claim 24, wherein the stream of the input data is a video data stream including sync signals, the source is a video source, the packet boundary is a frame boundary, and while the transmitter receives an initial portion of the video data stream from the video source but before the transmitter identifies the frame boundary in said video data stream, neither the transmitter nor the receiver changes state in a manner that depends on polarity of any of the sync signals of said video data stream.

26. The system of claim 24, wherein the data are encrypted data, the transmitter includes a cipher engine, the receiver includes a second cipher engine, the transmitter is operable in the transmission mode to generate the encrypted data by encrypting the input data from the source using the cipher engine, the receiver is operable in the transmission mode to generate decrypted data by decrypting the encrypted data using the second cipher engine, and the output of the second cipher engine is driven to a predetermined state during the mute mode.

27. The system of claim 1, wherein when the system is to operate in a second transmission mode following a first transmission mode, a first mute mode has occurred after the first transmission mode and before the second transmission mode, and the data to be transmitted over the link by the transmitter during the second transmission mode have different timing than the data transmitted over the link by the transmitter during the first transmission mode, the transmitter is configured to transmit the data with artificial timing signals during at least an initial portion of the second transmission mode, wherein the artificial timing signals are generated from timing parameters of the data at the end of the first transmission mode and timing parameters of the data at the end of the first mute mode.

28. The system of claim 1, wherein the data are video data, and when the system is to operate in a second transmission mode following a first transmission mode, a first mute mode has occurred after the first transmission mode and before the second transmission mode, and the video data to be transmitted over the link by the transmitter during the second transmission mode have different timing than the video data transmitted over the link by the transmitter during the first transmission mode, the transmitter is configured to transmit the video data with artificial timing signals during at least an initial portion of the second transmission mode, wherein the artificial timing signals are generated from timing parameters of the video data at the end of the first transmission mode and timing parameters of the video data at the end of the first mute mode.

29. The system of claim 28, wherein the transmitter is configured to generate the artificial timing signals by interpolating between the timing parameters of the video data at the end of the first transmission mode and the timing parameters of the video data at the end of the mute mode.

30. A transmitter, for use in a communication system including a receiver and at least one serial link coupled to the receiver, wherein the transmitter is operable alternately in a transmission mode in which the transmitter sends packets of encrypted data to the receiver over the serial link when the transmitter is coupled to the serial link, and in a mute mode in which encrypted data transmission is interrupted, said transmitter including:
a cipher engine coupled to receive input data, and configured to generate the encrypted data by encrypting the input data during the transmission mode, and to save state during the mute mode; and
control circuitry, coupled to the cipher engine and to receive warning signals, and configured to cause the cipher engine to undergo transitions between operation in the transmission mode and operation in the mute mode in response to the warning signals, such that the transitions occur only at packet boundaries of the encrypted data.

31. The transmitter of claim 30, wherein the input data are video data, the cipher engine is configured to generate encrypted video data by encrypting the input data during the transmission mode, and the control circuitry is configured to cause the cipher engine to undergo the transitions between operation in the transmission mode and operation in the mute mode such that the transitions occur only at frame boundaries of the encrypted video data.

32. A receiver, for use in a communication system including a transmitter and at least one serial link coupled to the transmitter, wherein the receiver is operable alternately in a transmission mode and in a mute mode, wherein the receiver receives packets of encrypted data transmitted by the transmitter over the serial link during the transmission mode when the receiver is coupled to the serial link, said receiver including:
a cipher engine, coupled and configured to receive the encrypted data when the receiver is coupled to the serial link, to generate decrypted data by decrypting the encrypted data during the transmission mode, and to save state during the mute mode; and
control circuitry, coupled to the cipher engine, and coupled and configured to receive warning signals transmitted over the serial link when the receiver is coupled to said serial link, and to cause the cipher engine to undergo transitions between operation in the transmission mode and operation in the mute mode in response to the warning signals such that the transitions occur only at packet boundaries of the encrypted data.

33. The receiver of claim 32, wherein the encrypted data are encrypted video data, the cipher engine is configured to generate decrypted video data by decrypting the encrypted video data during the transmission mode, and the control circuitry is configured to cause the cipher engine to undergo the transitions between operation in the transmission mode and operation in the mute mode such that the transitions occur only at frame boundaries of the encrypted video data.

34. A method for transmitting data from a transmitter to a receiver over a serial link, said method including the steps of:
  (a) operating the transmitter and the receiver in a transmission mode in which the transmitter transmits packets of data to the receiver over the link; and
  (b) after step (a), and in response to at least one warning, operating the transmitter and the receiver in a mute mode in which transmission of the data over the link is interrupted at a packet boundary of the data and remains interrupted after occurrence of said packet boundary.

35. The method of claim 34, also including the step of:
  (c) after step (b), and in response to at least one subsequent warning, operating the transmitter and the receiver in a second transmission mode commencing at another packet boundary of the data, wherein the transmitter transmits additional packets of data to the receiver over the link during the second transmission mode.

36. The method of claim 34, wherein during step (b), the transmitter responds to the at least one warning by continuing to transmit the data over the link until the Nth packet boundary after receiving the at least one warning and then entering the mute mode before transmitting additional data, where N is a predetermined integer.

37. The method of claim 36, wherein the transmitter saves state upon entering the mute mode.

38. The method of claim 34, wherein during step (b), the transmitter responds to the at least one warning by continuing to transmit the data over the link until the first packet boundary after receiving said at least one warning and then entering the mute mode before transmitting additional data.

39. The method of claim 38, wherein the transmitter saves state upon entering the mute mode.

40. The method of claim 34, wherein the transmitter transmits frames of video data to the receiver over the link during step (a), and during the mute mode, transmission of the video data over the link is interrupted at a frame boundary of the video data and remains interrupted after occurrence of said frame boundary.

41. The method of claim 40, also including the step of:
  (c) after step (b), and in response to at least one subsequent warning, operating the transmitter and the receiver in a second transmission mode commencing at another frame boundary of the video data, wherein the transmitter transmits additional frames of video data to the receiver over the link during the second transmission mode.

* * * * *